(12) United States Patent
Westerman

(10) Patent No.: US 8,531,425 B2
(45) Date of Patent: Sep. 10, 2013

(54) MULTI-TOUCH INPUT DISCRIMINATION

(75) Inventor: Wayne Carl Westerman, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/560,719

(22) Filed: Jul. 27, 2012

(65) Prior Publication Data

US 2012/0287074 A1    Nov. 15, 2012

Related U.S. Application Data

(63) Continuation of application No. 13/353,273, filed on Jan. 18, 2012, now Pat. No. 8,243,041, which is a continuation of application No. 11/756,211, filed on May 31, 2007, now Pat. No. 8,130,203, which is a continuation-in-part of application No. 11/619,464, filed on Jan. 3, 2007, now Pat. No. 7,855,718.

(51) Int. Cl.
*G09G 5/00*    (2006.01)
*G06F 3/041*    (2006.01)

(52) U.S. Cl.
USPC .......................................... 345/173; 345/156

(58) Field of Classification Search
USPC ........... 345/156–184, 104; 178/18.01–20.04; 715/863
See application file for complete search history.

(56) References Cited

U.S. PATENT DOCUMENTS

| | | | |
|---|---|---|---|
| 4,056,754 A | 11/1977 | Bailey et al. | |
| 4,219,847 A | 8/1980 | Pinkney et al. | |
| 4,290,052 A | 9/1981 | Eichelberger et al. | |
| 4,293,734 A | 10/1981 | Pepper, Jr. | |
| 4,340,911 A | 7/1982 | Kato et al. | |
| 4,526,043 A | 7/1985 | Boie et al. | |
| 4,550,221 A | 10/1985 | Mabusth | |
| 4,598,420 A | 7/1986 | Harvey | |
| 4,617,563 A | 10/1986 | Fujiwara et al. | |
| 4,618,989 A | 10/1986 | Tsukune et al. | |
| 4,678,869 A | 7/1987 | Kable | |
| 4,686,332 A | 8/1987 | Greanias et al. | |
| 4,736,191 A | 4/1988 | Matzke et al. | |
| 4,746,770 A | 5/1988 | McAvinney | |
| 4,763,356 A | 8/1988 | Day, Jr. et al. | |

(Continued)

FOREIGN PATENT DOCUMENTS

| | | |
|---|---|---|
| EP | 0 397 428 A2 | 11/1990 |
| EP | 0 827 064 A2 | 3/1998 |

(Continued)

OTHER PUBLICATIONS

European Search Report mailed Jul. 25, 2012, for EP Patent Application No. 12164789.5, eight pages.

(Continued)

*Primary Examiner* — Alexander Eisen
*Assistant Examiner* — Patrick F Marinelli
(74) *Attorney, Agent, or Firm* — Morrison & Foerster LLP

(57) ABSTRACT

Techniques for identifying and discriminating between different types of contacts to a multi-touch touch-screen device are described. Illustrative contact types include fingertips, thumbs, palms and cheeks. By way of example, thumb contacts may be distinguished from fingertip contacts using a patch eccentricity parameter. In addition, by non-linearly deemphasizing pixels in a touch-surface image, a reliable means of distinguishing between large objects (e.g., palms) from smaller objects (e.g., fingertips, thumbs and a stylus) is described.

40 Claims, 7 Drawing Sheets

(56) References Cited

U.S. PATENT DOCUMENTS

| | | |
|---|---|---|
| 4,806,709 A | 2/1989 | Evans |
| 4,850,677 A | 7/1989 | Okumura |
| 4,896,363 A | 1/1990 | Taylor et al. |
| 4,899,138 A | 2/1990 | Araki et al. |
| 4,906,983 A | 3/1990 | Parker |
| 4,914,624 A | 4/1990 | Dunthorn |
| 4,952,932 A | 8/1990 | Sugino et al. |
| 4,954,967 A | 9/1990 | Takahashi |
| 4,968,877 A | 11/1990 | McAvinney et al. |
| 5,012,524 A | 4/1991 | LeBeau |
| 5,073,950 A | 12/1991 | Colbert et al. |
| 5,113,041 A | 5/1992 | Blonder et al. |
| 5,150,105 A | 9/1992 | Perbet et al. |
| 5,168,531 A | 12/1992 | Sigel |
| 5,189,711 A | 2/1993 | Weiss et al. |
| 5,189,732 A | 2/1993 | Kondo |
| 5,252,951 A | 10/1993 | Tannenbaum et al. |
| 5,267,327 A | 11/1993 | Hirayama |
| RE34,476 E | 12/1993 | Norwood |
| 5,276,794 A | 1/1994 | Lamb, Jr. |
| 5,293,430 A | 3/1994 | Shiau et al. |
| 5,305,017 A | 4/1994 | Gerpheide |
| 5,309,374 A | 5/1994 | Misra et al. |
| 5,327,161 A | 7/1994 | Logan et al. |
| 5,347,295 A | 9/1994 | Agulnick et al. |
| 5,367,453 A | 11/1994 | Capps et al. |
| 5,376,946 A | 12/1994 | Mikan |
| 5,386,219 A | 1/1995 | Greanias et al. |
| 5,414,227 A | 5/1995 | Schubert et al. |
| 5,420,936 A | 5/1995 | Fitzpatrick et al. |
| 5,422,831 A | 6/1995 | Misra et al. |
| 5,432,531 A | 7/1995 | Calder et al. |
| 5,446,480 A | 8/1995 | Yoshida |
| 5,457,476 A | 10/1995 | Jenson |
| 5,459,463 A | 10/1995 | Gruaz et al. |
| 5,463,388 A | 10/1995 | Boie et al. |
| 5,469,194 A | 11/1995 | Clark et al. |
| 5,479,528 A | 12/1995 | Speeter |
| 5,483,261 A | 1/1996 | Yasutake |
| 5,488,204 A | 1/1996 | Mead et al. |
| 5,491,495 A | 2/1996 | Ward et al. |
| 5,505,072 A | 4/1996 | Oreper |
| 5,513,309 A | 4/1996 | Meier et al. |
| 5,541,372 A | 7/1996 | Baller et al. |
| 5,543,588 A | 8/1996 | Bisset et al. |
| 5,543,590 A | 8/1996 | Gillespie et al. |
| 5,543,591 A | 8/1996 | Gillespie et al. |
| 5,546,334 A | 8/1996 | Hsieh et al. |
| 5,546,475 A | 8/1996 | Bolle et al. |
| 5,548,667 A | 8/1996 | Tu |
| 5,552,787 A | 9/1996 | Schuler et al. |
| 5,570,113 A | 10/1996 | Zetts |
| 5,572,717 A | 11/1996 | Pedersen |
| 5,583,543 A | 12/1996 | Takahashi et al. |
| 5,583,946 A | 12/1996 | Gourdol |
| 5,585,823 A | 12/1996 | Duchon et al. |
| 5,588,098 A | 12/1996 | Chen et al. |
| 5,594,806 A | 1/1997 | Colbert |
| 5,600,735 A | 2/1997 | Seybold |
| 5,602,943 A | 2/1997 | Velho et al. |
| 5,603,053 A | 2/1997 | Gough et al. |
| 5,612,719 A | 3/1997 | Beernink et al. |
| 5,627,567 A | 5/1997 | Davidson |
| 5,631,976 A | 5/1997 | Bolle et al. |
| 5,638,093 A | 6/1997 | Takahashi et al. |
| 5,648,642 A | 7/1997 | Miller et al. |
| 5,649,070 A | 7/1997 | Connell et al. |
| 5,666,438 A | 9/1997 | Beernink et al. |
| 5,673,066 A | 9/1997 | Toda et al. |
| 5,717,777 A | 2/1998 | Wong et al. |
| 5,732,230 A | 3/1998 | Cullen et al. |
| 5,734,742 A | 3/1998 | Asaeda et al. |
| 5,734,751 A | 3/1998 | Saito |
| 5,748,184 A | 5/1998 | Shieh |
| 5,751,851 A | 5/1998 | Guzik et al. |
| 5,757,478 A | 5/1998 | Ma |
| 5,764,218 A | 6/1998 | Della Bona et al. |
| 5,764,222 A | 6/1998 | Shieh |
| 5,768,492 A | 6/1998 | Schumer |
| 5,771,342 A | 6/1998 | Todd |
| 5,790,104 A | 8/1998 | Shieh |
| 5,793,355 A | 8/1998 | Youens |
| 5,796,389 A | 8/1998 | Bertram et al. |
| 5,797,396 A | 8/1998 | Geiser et al. |
| 5,805,144 A | 9/1998 | Scholder et al. |
| 5,808,605 A | 9/1998 | Shieh |
| 5,809,166 A | 9/1998 | Huang et al. |
| 5,812,118 A | 9/1998 | Shieh |
| 5,812,698 A | 9/1998 | Platt et al. |
| 5,825,352 A | 10/1998 | Bisset et al. |
| 5,825,675 A | 10/1998 | Want et al. |
| 5,831,602 A | 11/1998 | Sato et al. |
| 5,835,079 A | 11/1998 | Shieh |
| 5,838,302 A | 11/1998 | Kuriyama et al. |
| 5,852,434 A | 12/1998 | Sekendur |
| 5,852,669 A | 12/1998 | Eleftheriadis et al. |
| 5,856,822 A | 1/1999 | Du et al. |
| 5,856,824 A | 1/1999 | Shieh |
| 5,862,256 A | 1/1999 | Zetts et al. |
| 5,870,083 A | 2/1999 | Shieh |
| 5,870,771 A | 2/1999 | Oberg |
| 5,872,559 A | 2/1999 | Shieh |
| 5,874,948 A | 2/1999 | Shieh |
| 5,875,311 A | 2/1999 | Bertram et al. |
| 5,880,411 A | 3/1999 | Gillespie et al. |
| 5,896,126 A | 4/1999 | Shieh |
| 5,898,422 A | 4/1999 | Zetts |
| 5,898,434 A | 4/1999 | Small et al. |
| 5,933,134 A | 8/1999 | Shieh |
| 5,936,615 A | 8/1999 | Waters |
| 5,940,065 A | 8/1999 | Babb et al. |
| 5,943,043 A | 8/1999 | Furuhata et al. |
| 5,956,682 A | 9/1999 | Loudermilk et al. |
| 5,963,190 A | 10/1999 | Tsuboyama et al. |
| 5,977,950 A | 11/1999 | Rhyne |
| 5,982,302 A | 11/1999 | Ure |
| 5,987,162 A | 11/1999 | Nakata |
| 6,005,959 A | 12/1999 | Mohan et al. |
| 6,005,963 A | 12/1999 | Bolle et al. |
| 6,008,800 A | 12/1999 | Pryor |
| 6,016,355 A | 1/2000 | Dickinson et al. |
| 6,023,313 A | 2/2000 | Hazama |
| 6,029,214 A | 2/2000 | Dorfman et al. |
| 6,037,882 A | 3/2000 | Levy |
| 6,049,329 A | 4/2000 | Zetts et al. |
| 6,067,079 A | 5/2000 | Shieh |
| 6,075,520 A | 6/2000 | Inoue et al. |
| 6,088,025 A | 7/2000 | Akamine et al. |
| 6,118,435 A | 9/2000 | Fujita et al. |
| 6,121,960 A | 9/2000 | Carroll et al. |
| 6,128,014 A | 10/2000 | Nakagawa et al. |
| 6,147,680 A | 11/2000 | Tareev |
| 6,169,538 B1 | 1/2001 | Nowlan et al. |
| 6,175,644 B1 | 1/2001 | Scola |
| 6,184,926 B1 | 2/2001 | Khosravi et al. |
| 6,188,391 B1 | 2/2001 | Seely et al. |
| 6,222,508 B1 | 4/2001 | Alvelda et al. |
| 6,262,717 B1 | 7/2001 | Donohue et al. |
| 6,271,860 B1 | 8/2001 | Gross |
| 6,279,170 B1 | 8/2001 | Chu |
| 6,281,887 B1 | 8/2001 | Wang |
| 6,283,858 B1 | 9/2001 | Hayes et al. |
| 6,310,610 B1 | 10/2001 | Beaton et al. |
| 6,310,964 B1 | 10/2001 | Mohan et al. |
| 6,311,162 B1 | 10/2001 | Reichwein et al. |
| 6,323,846 B1 | 11/2001 | Westerman et al. |
| 6,353,433 B1 | 3/2002 | Schumer |
| 6,380,929 B1 | 4/2002 | Platt |
| 6,392,636 B1 | 5/2002 | Ferrari et al. |
| 6,504,530 B1 | 1/2003 | Wilson et al. |
| 6,518,957 B1 | 2/2003 | Lehtinen et al. |
| 6,552,719 B2 | 4/2003 | Lui et al. |
| 6,567,549 B1 | 5/2003 | Marianetti et al. |
| 6,610,936 B2 | 8/2003 | Gillespie et al. |

| | | | |
|---|---|---|---|
| 6,633,683 B1 | 10/2003 | Dinh et al. | |
| 6,657,614 B1 | 12/2003 | Ito et al. | |
| 6,664,982 B1 | 12/2003 | Bi | |
| 6,690,387 B2 | 2/2004 | Zimmerman et al. | |
| 6,727,891 B2 | 4/2004 | Moriya et al. | |
| 6,738,154 B1 | 5/2004 | Venable | |
| 6,788,815 B2 | 9/2004 | Lui et al. | |
| 6,924,790 B1 | 8/2005 | Bi | |
| 7,015,894 B2 | 3/2006 | Morohoshi | |
| 7,030,860 B1 | 4/2006 | Hsu et al. | |
| 7,030,862 B2 | 4/2006 | Nozaki | |
| 7,038,659 B2 | 5/2006 | Rajkowski | |
| 7,053,886 B2 | 5/2006 | Shin | |
| 7,184,064 B2 | 2/2007 | Zimmerman et al. | |
| 7,274,353 B2 | 9/2007 | Chiu et al. | |
| 7,283,126 B2 | 10/2007 | Leung | |
| 7,292,229 B2 | 11/2007 | Morag et al. | |
| 7,339,580 B2 | 3/2008 | Westerman et al. | |
| 7,444,163 B2 | 10/2008 | Ban et al. | |
| 7,633,076 B2 | 12/2009 | Huppi et al. | |
| 7,855,718 B2 | 12/2010 | Westerman | |
| 8,130,203 B2 | 3/2012 | Westerman | |
| 8,243,041 B2 | 8/2012 | Westerman | |
| 8,384,684 B2 | 2/2013 | Westerman | |
| 2001/0030637 A1 | 10/2001 | Geisow et al. | |
| 2002/0008711 A1 | 1/2002 | Karjalainen | |
| 2002/0015024 A1* | 2/2002 | Westerman et al. | 345/173 |
| 2002/0080123 A1 | 6/2002 | Kennedy et al. | |
| 2002/0191029 A1 | 12/2002 | Gillespie et al. | |
| 2003/0117380 A1 | 6/2003 | Kanzaki | |
| 2003/0161517 A1 | 8/2003 | Vuylsteke | |
| 2003/0214488 A1 | 11/2003 | Katoh | |
| 2004/0119700 A1 | 6/2004 | Ichikawa | |
| 2004/0178998 A1 | 9/2004 | Sharp et al. | |
| 2005/0052427 A1 | 3/2005 | Wu et al. | |
| 2005/0104867 A1 | 5/2005 | Westerman et al. | |
| 2005/0226505 A1 | 10/2005 | Wilson | |
| 2005/0227217 A1 | 10/2005 | Wilson | |
| 2006/0026521 A1 | 2/2006 | Hotelling et al. | |
| 2006/0044259 A1 | 3/2006 | Hotelling et al. | |
| 2006/0044280 A1 | 3/2006 | Huddleston et al. | |
| 2006/0097991 A1* | 5/2006 | Hotelling et al. | 345/173 |
| 2006/0161871 A1 | 7/2006 | Hotelling et al. | |
| 2006/0197750 A1 | 9/2006 | Kerr et al. | |
| 2006/0197753 A1 | 9/2006 | Hotelling | |
| 2006/0232567 A1 | 10/2006 | Westerman et al. | |
| 2007/0083372 A1 | 4/2007 | Cho et al. | |
| 2008/0012835 A1* | 1/2008 | Rimon et al. | 345/173 |
| 2008/0042978 A1* | 2/2008 | Perez-Noguera | 345/168 |
| 2008/0158145 A1 | 7/2008 | Westerman | |
| 2008/0158170 A1 | 7/2008 | Herz et al. | |
| 2008/0158185 A1 | 7/2008 | Westerman | |
| 2011/0080365 A1 | 4/2011 | Westerman | |
| 2012/0113041 A1 | 5/2012 | Westerman | |

FOREIGN PATENT DOCUMENTS

| | | |
|---|---|---|
| EP | 0 827 064 A3 | 3/1998 |
| EP | 0 827 064 B1 | 3/1998 |
| GB | 2 139 762 A | 11/1984 |
| GB | 2 344 894 A | 6/2000 |
| JP | 06-161661 A | 6/1994 |
| JP | 62-030888 A | 8/1994 |
| JP | 07-110741 A | 4/1995 |
| JP | 2000-163031 A | 6/2000 |
| JP | 2000-300543 A | 10/2000 |
| JP | 2002-342033 A | 11/2002 |
| JP | 2004-178547 A | 6/2004 |
| KR | 100 664 964 B1 | 12/2006 |
| WO | WO-96/15464 A1 | 5/1996 |
| WO | WO-97/18547 A1 | 5/1997 |
| WO | WO-99/38149 A1 | 7/1999 |
| WO | WO-2004/021261 A1 | 3/2004 |
| WO | WO-2005/114369 A2 | 12/2005 |
| WO | WO-2006/020305 A2 | 2/2006 |
| WO | WO-2006/020305 A3 | 2/2006 |
| WO | WO-2006/074289 A2 | 7/2006 |
| WO | WO-2006/133018 A2 | 12/2006 |
| WO | WO-2006/133018 A3 | 12/2006 |
| WO | WO-2008/085404 A2 | 7/2008 |
| WO | WO-2008/085785 A3 | 10/2008 |
| WO | WO-2008/085785 A2 | 10/2008 |

OTHER PUBLICATIONS

European Search Report mailed Jul. 25, 2012, for EP Patent Application No. 12164794.5, five pages.

Yao, M. Y-S. et al. (Mar. 2002). "Quantifying Quality: A Case Study in Fingerprints," *Proceedings IEEE Conference on Audio ID, IEEE*, six pages.

Adams, H.G. et al. (Jul. 1985). "Automated Radiographic Report Generation Using Barcode Technology," *American Journal of Roentgenology* 145(1):177-180.

Agrawal, R. et al. (Jul. 1986). "An Overview of Tactile Sensing," Center For Research on Integrated Manufacturing: Robot Systems Division, The University of Michigan, 47 pages.

Anonymous. (1989). "Concorde Version 3.0: Turns a PC into a Graphics Workstation," *News and Views: Tektronix, Inc. Bioinformatics*, 5(1):63-75.

Anonymous. (May 8, 1992). "The Sensor Frame Graphic Manipulator," *NASA Phase II Final Report*, 28 pages.

Apte, A. et al. (Nov. 1993). "Recognizing Multistroke Geometric Shapes: An Experimental Evaluation," *Association for Computing Machinery* UIST '93, Atlanta, GA, Nov. 3-5, 1993, 121-128.

Bolle, R.M. et al. (1996) "Veggie Vision: A Producee Recognition System," *IEEE* pp. 244-251.

Brown, E. et al. (1990). "Windows on Tablets as a Means of Achieving Vitrual Input Devices," *Interact '90*, pp. 675-681.

Buxton, W. (1986). "There's More to Interaction Than Meets the Eye: Some Issues in Manual Input," *User Centered System Design, New Perspectives on Human-Computer Interaction*, pp. 319-337.

Buxton, W. et al. (Jul. 1985). "Issues and Techniques in Touch-Sensitive Tablet Input," *Association for Computing Machinery* SIGGRAPH '85, San Francisco, CA, Jul. 22-26, 1985, 19(3):215-224.

Buxton, W. et al. (1986). "A Study in Two-Handed Input," *Proceedings of CHI '86*, pp. 321-326.

Buxton, W.A.S. (Mar./Apr. 1994). "Two-Handed Document Navigation," *Xerox Disclosure Journal* 19(2):103-108.

Charlebois, M. et al. (1996). "Curvature Based Shape Estimation Using Tactile Sensing," *Proceedings 1996 IEEE International Conference on Robotics and Automation*, six pages.

Charlebois, M.A. (Dec. 1996). "Exploring the Shape of Objects with Curved Surfaces Using Tactile Sensing," A Thesis Submitted in Partial Fulfillment of the Requirements for the Degree of Master of Applied Science, Simon Fraser University, Burnaby, British Columbia, Canada, 108 pages.

Cirque Corporation. (1994). GlipePoint® Portable Touch Surface Round Mouse Post PS/2 Version User's Guide, Guide Version 1.0, 16 pages.

Colosi, J. ed. (Dec. 15, 1984). Computer News, *Hewlett-Packard* 10(4):1-27.

Dario, P. et al. (1986). "A Sensorised Scenario for Basic Investigation on Active Touch," in *Robot Sensors* vol. 2—*Tactile and Non-Vision*, Pugh, A. ed., IFS Publications: UK, pp. 237-245.

Davies, E.R. (1990). *Machine Vision: Theory, Algorithms, Practicalities*, Academic Press, Inc.: San Diego, CA, 575 pages.

Davies, E.R. (1990). *Machine Vision: Theory, Algorithms, Practicalities*, Academic Press, Inc..: San Diego, CA, pp. xi-xxi (Table of Contents Only.).

Davies, E.R. (1997). "Boundary Pattern Analysis," Chapter 7 in *Machine Vision: Theory Algorithms Practicalities*, 2nd Edition, Academic Press, Inc.: San Diego, CA, pp. 171-191.

Davies, E.R. (1997). "Ellipse Detection," Chapter 11 in *Machine Vision: Theory Algorithms Practicalities*, 2nd Edition, Academic Press, Inc.: San Diego, CA, pp. 271-290.

Davies, E.R. (1997). "Image Acquisition," Chapter 23 in *Machine Vision: Theory Algorithms Practicalities*, 2nd Edition, Academic Press, Inc.: San Diego, CA, pp. 583-601.

Davies, E.R. (Aug. 1987). "Lateral Histograms for Efficient Object Location: Speed Versus Ambiguity," *Pattern Recognition Letters* 6(3):189.

Desai, A. et al. (1994). "On the Localization of Objects Using an FSR Pressure Pad Transducer," *IEEE* pp. 953-957.

Desai, A.M. (Nov. 1994). "Interpretation of Tactile Data From an FSR Pressure Pad Transducer Using Image Processing Techniques," A Thesis Submitted in Partial Fulfillment of the Requirements for the Degree of Master of Applied Science, Simon Fraser University, Burnaby, British Columbia, Canada, 157 pages.

Duda, R.O. et al. (2001). "Introduction," Chapter 1 in *Pattern Classification*, pp. 1-13.

Dvorak, J. (Apr. 1992). "Whatever Happened to the Gavilan Mobile Computer?," *Computer Shopper* 12(4):668, Dialog® search result, nine pages.

ELO Touchsystems, Inc. (1993). SmartSet™ Touchscreen Controller Family Technical Reference Manual, Manual Version 1.0, 139 pages.

Elographics, Inc. (1988). E271-140 AccuTouch® Serial Touchscreen Controller, User's Manual Version 2.0, 24 pages.

Elographics, Inc. (1989). "All the Building Blocks You Need to Quickly Develop Touchscreen Applications," eight pages.

Elographics, Inc. (1989). "Application Development Tools," four pages.

Elographics, Inc. (1990). ELODEV™ Touchscreen Driver Program Version 1.4, Installation Guide and Programmer's Reference Manual, Manual Version 2.0c, 119 pages.

Elographics, Inc. (1990). MonitorMouse™ and MonitorMouse for Windows™ 3.0, Version 1.2, User's Guide, Manual Version 1.2, 33 pages.

Elographics, Inc. (1993). "In Touch with Excellence," seven pages.

Elographics, Inc. (1993). TouchBack™ Version 1.2 Programmer's Reference Manual, Manual Version 2.0a, 70 pages.

European Search Report mailed Jul. 4, 2012, for EP Patent Application No. 12164786.1, 10 pages.

European Search Report mailed Jul. 4, 2012, for EP Patent Application No. 12164793.7, nine pages.

European Search Report mailed Jul. 6, 2012, for EP Patent Application No. 12164790.3, six pages.

European Search Report mailed Jul. 6, 2012, for EP Patent Application No. 12164791.1, seven pages.

Everett, H.R. (1995). *Sensors for Mobile Robots: Theory and Application*, AK Peters, Ltd.: Wellesley, MA, pp. v-x (Table of Contents Only.).

Fearing, R.S. (1988). "Tactile Sensing, Perception and Shape Interpretation," A Dissertation Submitted to the Department of Electrical Engineering and the Committee on Graduate Studies of Stanford University in Partial Fulfillment of the Requirements for the Degree of Doctor of Philosophy, presented Dec. 1987, 160 pages.

Fearing, R.S. (Jun. 1990). "Tactile Sensing Mechanisms," *Robotics Research* 9(3):3-23.

Gavilan Computer Corporation. (Jan. 23, 1984). Gavilan™ Mobile Computer: MS-DOS User's Guide, Part No. 620-0010-02, 276 pages.

Geman, S. et al. (Nov. 1984). "Stochastic Relaxation, Gibbs Distributions, and The Bayesian Restoration of Images," *IEEE Transactions on Pattern Analysis and Machine Intelligence* 6(6):721-741.

Ghani, N. (Oct. 1988). "Visual and Tactile Senses in Collaboration," *The International Journal of Sensing for Industry* pp. 210-215. (the article saved in FTP as Ghani is the Sears article).

Golub, G. et al. (1983). "Measuring Vectors, Matrices, Subspaces, and Linear System Sensitivty," Chapter 2 in *Matrix Computations*, Johns Hopkins University Press: Baltimore, MD, pp. 10-30.

Gonzalez, Rafael C. et al., "Digital Image Processing (passage)", Prentice Hall, Upper Saddle River, New Jersey, Jan. 1, 2002.

Goodisman, A. (May 10, 1991). "A Stylus-Based User Interface for Text: Entry and Editing," Thesis (B.S./M.S.) MIT Department of Electrical Engineering and Computer Science, pp. 1-100.

Hackwood, S. et al. (1986). "Torque-Sensitive Tactile Array for Robotics," in *Robot Sensors* vol. 2—*Tactile and Non-Vision*, Pugh, A. ed., IFS Publications: UK, pp. 123-131.

Harmon, L.D. (Summer 1982). "Automated Tactile Sensing," *The International Journal of Robotics Research* 1(2):3-32.

Harrison, B.L. et al. (Apr. 18, 1998). "Squeeze Me, Hold Me, Tilt Me! An Exploration of Manipulative User Interfaces," *CHI 98, Human Factors in Computing Systems, Conference Proceedings*, Los Angeles, CA, Apr. 18-23, 1998.

Holland, S. (Jul. 1989). "Artificial Intelligence, Education and Music: The Use of Artificial Intelligence to Encourage and Facilitate Music Composition by Novices," CITE Report No. 88, *Centre for Information Technology in Education*, 309 pages.

Hurst, M.P. (Jul. 1995). "Configurator: A Configuration Program for Satellite Dish Hardware," Thesis (M.S.) MIT Department of Electrical Engineering and Computer Science, pp. 1-74.

International Preliminary Report on Patentability mailed Jul. 7, 2009, for PCT Application No. PCT/2007/026145, filed Dec. 21, 2007, 13 pages.

International Preliminary Report on Patentability Response mailed Sep. 23, 2010, in EP Patent Application No. 07863193.4, 15 pages.

International Search Report mailed Jul. 29, 2008, for PCT Application No. PCT/2007/089164, filed Dec. 28, 2007, three pages.

International Search Report mailed Dec. 4, 2008, for PCT Application No. PCT/2007/026145, filed Dec. 21, 2007, nine pages.

Invitation to Pay Additional Fees mailed Jul. 16, 2008, for PCT Application No. PCT/US07/26145, filed Dec. 21, 2007, six pages.

Jayawant, B.V. et al. (1986). "Robot Tactile Sensing: A New Array Sensor," in *Robot Sensors* vol. 2—*Tactile and Non-Vision*, Push, A. ed., IFS Publications: UK, pp. 199-205.

Kahn, R.E. et al. (Mar. 1988). "An Open Architecture for a Digital Library System and a Plan for Its Development," in The Digital Library Project: The World of Knowbots, Corporation for National Research Initiatives, 1:1-48.

Kirk, D.E. (1970). "The Method of Steepest Descent," Chapter 6.2 in *Optimal Control Theory: An Introduction*, Prentice-Hall, Inc.: Englewood Cliffs, NJ, pp. 331-343.

Kjeldsen, F.C.M. (1997). "Visual Interpretation of Hand Gestures as a Practical Interface Modality," Thesis (Ph.D.) Columbia University, Graduate School of Arts, pp. 1-198.

Konrad, J. (1980). "Bayesian Estimation of Motion Fields from Image Sequences," Thesis, McGill University, Department of Electrical Engineering, pp. 1-237.

Krueger, M. et al. (Jun. 10, 1988). "Videoplace, Responsive Environment, 1972-1990," located at http://www.youtube.com/watch?v=dmmxVA5xhuo, last visited Aug. 5, 2011, two pages.

Kurtenbach, G.P. (1983). "The Design and Evaluation of Marking Menus," A Thesis Submitted in Conformity with the Requirements of the Degree of Doctor of Philosophy, University of Toronto, Toronto, Canada, 201 pages.

Lee, S. (Oct. 1984). "A Fast Multiple-Touch-Sensitive Input Device," A Thesis Submitted in Conformity with the Requirements for the Degree of Master of Applied Science in the Department of Electrical Engineering, University of Toronto, 115 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Leonard, J.J. et al. (Jun. 1991). "Mobile Robot Localization by Tracking Geometric Beacons," *IEEE Transaction on Robotics and Automation* 7(3):376-382.

Leung, A. et al. (1994). "Application of Adaptive Neural Network to Localization of Objects Using Pressure Array Transducer," *IEEE* pp. 2114-2119.

Liu, H. et al. (Jun. 1993). "Development of a New Kind of Robot Slipping Sensor," *Proceedings of the 1993 American Control Conference*, Jun. 2-4, 1993, San Francisco, CA, pp. 756-757.

Logitech, Fremont, Inc. (Aug. 2, 1998). P2.1 Touchpad, Firmware Engineering Specification FWS-761588-0000, Revision A, 25 pages.

Logitech, Inc. (Jun. 24, 1997). TP3™-Standard Touch Pad Product Specification, Document ID: PS-761311-0000-USA, 27 pages.

Mehta, N. (Oct. 1982). "A Flexible Human Macine Interface," A Thesis Submitted in Conformity with the Requirements for the Degree of Master of Applied Science in the University of Toronto, 87 pages.

Microtouch Sysyems, Inc. (1993). TouchWare for DOS, Windows and NT, User's Guide, Revision 3.0 #19-207, 33 pages.

Microtouch Sysyems, Inc. (1993). Windows Touch Driver, User's Guide, Revision 2.0 #9006601, 26 pages.

Miller, D. et al. (Feb./Mar. 1994). "Combined Source-Channel Vector Quantization Using Deterministic Annealing," *IEEE Transactions on Communications* 42(2/3/4):347-356.

Moroney, D.T. (Mar. 1992). "Use of an Optical Multichannel Analyzer for Reflectivity Measurements," Submitted in Partial Fulfillment of the Requirements for the Degree of Master of Science in Astronautical Engineering, Naval Postgraduate School, Monterrey, CA, 187 pages.

Mui, L. (Aug. 22, 1995). "A Statistical Multi-Experts Approach to Image Classification and Segmentation," Thesis (B.S./M.Eng.) MIT Department of Electrical Engineering and Computer Science, pp. 1-177 (submitted in two parts).

Nicholls, H.R. et al. (Jun. 1989). "A Survey of Robot Tactile Sensing Technology," *The International Journal of Robotics Research* 8(3):3-30.

Non-Final Office Action mailed Oct. 22, 2009, for U.S. Appl. No. 11/619,464, filed Jan. 3, 2007, 49 pages.

Notice of Allowance mailed Feb. 17, 2010, for U.S. Appl. No. 11/619,464, filed Jan. 3, 2007, 11 pages.

Notice of Allowance mailed Jul. 9, 2010, for U.S. Appl. No. 11/756,211, filed May 31, 2007, 13 pages.

Notice of Allowance mailed Nov. 2, 2010, for U.S. Appl. No. 11/619,464, filed Jan. 3, 2007, 10 pages.

Notice of Allowance mailed Aug. 2, 2011, for U.S. Appl. No. 11/756,211, filed May 31, 2007, 11 pages.

Notice of Allowance mailed Oct. 18, 2011, for U.S. Appl. No. 11/756,211, filed May 31, 2007, 11 pages.

Notice of Allowance mailed Apr. 12, 2012, for U.S. Appl. No. 13/353,273, filed Jan. 18, 2012, 12 pages.

Nowlin, W.C. (Apr. 1991). "Experimental Results on Bayesian Algorithms for Interpreting Compliant Tactile Sensing Data," *Proceedings of the 1991 IEEE International Conference on Robotics and Automation*, Sacramento, CA, pp. 378-383.

Ogawa, H. (1979). "Preprocessing for Chinese Character Recognition and Global Classification of Handwritten Chinese Characters," *Pattern Recognition*, 11(1):1-7.

Poggio, T. et al. (1990). "The MIT Vision Machine," Chapter 42 in *Artificial Intelligence*, MIT Press: Cambridge, MA, pp. 493-529.

Pugh, A. ed. (1986). International Trends in Manufacturing Technology: *Robot Sensors* vol. 2—*Tactile and Non-Vision*, 3 pages (Table of Contents Only).

Quantum Research Group Ltd. (1997). QT9701B2 Datasheet, 30 pages.

Rebman, J. et al. (1986). "A Tactile Sensor with Electrooptical Transduction," in *Robot Sensors* vol. 2—*Tactile and Non-Vision*, Pugh, A. ed., IFS Publications: UK, pp. 145-155.

Rekimoto, J. (Apr. 20, 2002). "SmartSkin: An Infrastructure for Freehand Manipulation on Interactive Surfaces," *CHI 2002 Conference Proceedings. Conference on Human Factors in Computing Systems*, Minneapolis, MN, Apr. 20-25, 2002, pp. 113-120.

Robertson, B.E. et al. (1986). "Tactile Sensor System for Robotics," in International Trends in Manufacturing Technology: *Robot Sensors* vol. 2—*Tactile and Non-Vision*, Pugh, A. ed., IFS Publications: UK, pp. 89-97.

Rubine, D. (Jul. 1991). "Specifying Gestures by Example," *Computer Graphics* 25(4):329-337.

Rubine, D. (Sep. 1988). "The VideoHarp," *Proceedings of the 14th International Computer Music Conference*, Cologne, FR, Sep. 20-25, 1988, 11 pages.

Rubine, D. et al. (1990) "Programmable Finger-Tracking Instrument Controllers," *Computer Music Journal* 14(1):26-41.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Rusaw, S. et al. (May 1998). "Determining Polygon Orientation Using Model Based Force Interpretation," *Proceedings of the 1998 IEEE International Conference on Robotics and Automation*, Leuven, Belgium, pp. 544-549.

Sato, N. et al. (1986). "A Method for Three-Dimensional Part Identification by Tactile Transducer," in *Robot Sensors* vol. 2—*Tactile and Non-Vision*, Pugh, A. ed., IFS Publications: UK, pp. 133-143.

Sears, A. et al. (Jan. 23, 1989). "High Precision Touchscreens: Design Strategies and Comparisons With a Mouse," *Human-Computer Interaction Laboratory*, University of MD, pp. 1-23.

Sensor Frame Corporation. (May 8, 1990). "The Sensor Frame Graphic Manipulator Final Report," Sensor Frame Corporation: NASA-CR-194243, 28 pages.

Sethi, M. (1997). "Generating Clouds in Computer Graphics," A Thesis Submitted in Partial Fulfillment of the Requirements for the Degree of M.Sc. in Computer Science, 154 pgs.

Siegel, D.M. et al. (1987). "Performance Analysis of a Tactile Sensor," *IEEE*, pp. 1493-1499.

Son, J.S. et al. (1996). "Comparison of Contact Sensor Localization Abilities During Manipulation," *Robotics and Autonomous System* 17 pp. 217-233.

Speeter, T.H. (Nov. 1988). "Flexible, Piezoresitive Touch Sensing Array," Optics Illumination and Imaging Sensing for Machine Vision III, *SPIE* 1005:31-43.

Stansfield, S.A. (Mar. 1990). "Haptic Perception With an Articulated, Sensate Robot Hand," *SANDIA Report*: SAND90-0085-UC-406, 37 pages.

Stap, J.W. (Jun. 29, 1992). "Automatic 3-D Measurement of Workpieces on a Ship Repair Yard," M.Sc. Thesis, 132 pages.

Stauffer, R.N., ed. (Jun. 1983). "Progress in Tactile Sensor Development," *Robotics Today* pp. 43-49.

Sugiyama, S. et al. (Mar. 1990). "Tactile Image Detection Using a 1K-Element Silicon Pressure Sensor Array," *Sensors and Actuators*, A22(Nos. 1-2):397-400.

Summagraphics Corporation. (1987). Four-Button Cursor for the Summagraphics® Bit Pad® Plus, one page.

Summagraphics Corporation. (Sep. 1989). CR™ 1212 Graphics Tablet Technical Reference, Publication #84-2001-002, 53 pages.

Synaptics Pilotfish, "Onyx", http://www.web.archive.org/web/20061125030217/http://www.synaptics.com/products/pdf/onyx_concept.pdf>, Nov. 25, 2006.

Synaptics, Inc. (1999). The TouchPad: A Revolutionary Human Interface Device, four pages.

Van Brussel, H. et al. (Jun. 1986). "A High Resolution Tactile Sensor for Part Recognition," *Proceedings of the 6th International Conference on Robot Vision and Sensory Controls*, Paris, France, Jun. 3-5, 1986, pp. 49-59.

Velasco, V.B. Jr. (Aug. 1997). "A Methodology for Computer-Assisted Gripper Customization Using Rapid Prototyping Technology," Thesis Submitted in Partial Fulfillment of the Requirements for the Degree of Ph.D., 199 pages.

Want, R. et al. (Mar. 1995). "The ParcTab Ubiquitous Computing Experiment," Technical Report CSL-95-1, *Xerox*, 44 pages.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Wolfeld, J.A. (Aug. 1981). "Real Time Control of a Robot Tactile Sensor," Thesis Presented in Partial Fulfillment of the Requirements for the Degree of Master of Science in Engineering for Graduate Work in Computer and Information Science, 68 pages.

Yaniger, S.L. (Apr. 1991). "Force Sensing Resisotrs: A Review of the Technology," Elector International Conference Record, Apr. 16-18, 1991, New York, NY pp. 666-668.

Notice of Allowance mailed Nov. 16, 2012, for U.S. Appl. No. 12/965,327, filed Dec. 10, 2010, 18 pages.

* cited by examiner

MULTI-TOUCH INPUT DISCRIMINATION

CROSS REFERENCE TO RELATED APPLICATIONS

This application is a continuation of U.S. patent application Ser. No. 13/353,273, filed Jan. 18, 2012, which is a continuation of U.S. patent application Ser. No. 11/756,211, filed May 31, 2007 (now U.S. Pat. No. 8,130,203), which is a continuation-in-part of U.S. patent application Ser. No. 11/619,464, filed Jan. 3, 2007 (now U.S. Pat. No. 7,855,718), the entire disclosures of which are incorporated herein by reference for all purposes.

BACKGROUND

This application is a continuation-in-part of, and claims priority on, U.S. patent application Ser. No. 11/619,464, entitled "Multi-Touch Input Discrimination," filed Jan. 3, 2007 (now U.S. Pat. No. 7,855,718), and which is hereby incorporated by reference. The subject matter described and claimed herein is also related to the subject matter described in U.S. Pat. No. 6,323,846, issued Nov. 27, 2001, entitled "Method and Apparatus for Integrating Manual Input" by W. Westerman and J. Elias and which is hereby incorporated by reference as well.

The invention relates generally to data input methods and devices for electronic equipment and, more particularly, to methods and devices for discriminating between various inputs to a multi-touch touch-surface input device.

There currently exist many types of input devices for performing operations with an electronic system. These operations often correspond to moving a cursor and/or making selections on a display screen. Illustrative electronic systems include tablet, notebook, desktop and server computer systems, personal digital assistants, audio and video control systems, portable music and video players and mobile and satellite telephones. The use of touch pad and touch screen systems (collectively "touch-surfaces") has become increasingly popular in these types of electronic systems because of their ease of use and versatility of operation.

One particular type of touch-surface is the touch screen. Touch screens typically include a touch panel, a controller and a software driver. The touch panel is characteristically an optically clear panel with a touch sensitive surface that is positioned in front of a display screen so that the touch sensitive surface is coextensive with a specified portion of the display screen's viewable area (most often, the entire display area). The touch panel registers touch events and sends signals indicative of these events to the controller. The controller processes these signals and sends the resulting data to the software driver. The software driver, in turn, translates the resulting data into events recognizable by the electronic system (e.g., finger movements and selections).

Unlike earlier input devices, touch-surfaces now becoming available are capable of simultaneously detecting multiple objects as they approach and/or contact the touch-surface, and detecting object shapes in much more detail. To take advantage of this capability, it is necessary to measure, identify and distinguish between the many kinds of objects that may approach or contact such touch-surfaces simultaneously. Prior art touch-surface systems (including their supporting software and/or circuitry) do not provide a robust ability to do this. Thus, it would be beneficial to provide methods and devices that identify and discriminate multiple simultaneous hover or touch events such as, for example, two or more closely grouped fingers, palm heels from one or more fingers, fingers from thumbs, and fingers from ears and cheeks.

SUMMARY

In one embodiment the invention provides a method to discriminate input sources to a touch-surface device. One method includes obtaining a proximity image, segmenting the image into a plurality of patches, determining an eccentricity value for each patch, identifying those patches have an eccentricity value greater than a first threshold as a thumb contact. This method may also be used to identify fingertip contacts (i.e., those patches having an eccentricity value less than the first threshold).

Another method includes obtaining a proximity image, segmenting the image to identify a plurality of patches (each patch having one or more pixels and each pixel having a value), reducing the value of each pixel in a non-linear fashion, determining a minor radius value for each patch, identifying those patches having a minor radius value greater than a specified radius as a palm contacts, and using the identified patch to control an operation of a touch-surface device.

In another embodiment, the first and second methods may be combined. Thresholds may comprise constant values, linear functions or non-linear functions. Illustrative operations of a touch-surface device include, but are not limited to, rejecting spurious input and changing the operating mode of the touch-surface device. Illustrative modes changes include, but are not limited to, dimming the device's backlight, putting the device to sleep, waking the device from a low-power state, putting the device into a low power state (e.g., off or "sleep") and, for mobile telephones, answering calls and terminating calls. One of ordinary skill in the art will recognize that the methods described herein may be organized as one or more program modules, stored in a tangible form (e.g., a magnetic disk), and executed by a programmable control device (e.g., a computer processor).

DETAILED DESCRIPTION

Methods and devices to detect and discriminate between multiple simultaneous close approaches or touches to a touch-surface are described. The following embodiments are presented to enable any person skilled in the art to make and use the invention as claimed and are provided in the context of mutual capacitance touch-surface devices. Variations using other types of touch-surfaces such as force or optical sensing touch-surfaces will be readily apparent to those skilled in the art. Accordingly, the claims appended hereto are not intended to be limited by the disclosed embodiments, but are to be accorded their widest scope consistent with the principles and features disclosed herein.

As previously noted, recent touch-surface input devices are capable of simultaneously detecting multiple objects as they approach and/or contact the touch-surface. For a hand-held multi-touch touch-surface device that may be put into a pocket, purse, or held against the head (e.g., portable music player, portable video player, personal digital assistant or mobile phone), detecting when the device is being clasped on the way into or out of the pocket, against the body, or against the head is very useful for: input rejection (ensuring that touch-surface input signals generated as a result of these actions are not mistaken for normal finger/stylus touches); operational mode transitions (e.g., dimming the device's backlight, putting the device to sleep and waking the device from a low-power state); and, for mobile telephones, answering calls (e.g., when the device is brought near, but not necessarily touching the head) and/or terminating calls (e.g., when the unit is placed into a pocket or purse).

Each sensing element (aka "pixel") in a two dimensional array of sensing elements (i.e., a touch-surface) generates an output signal indicative of the electric field disturbance (for capacitance sensors), force (for pressure sensors) or optical coupling (for optical sensors) at the sensor element. The ensemble of pixel values represents a "proximity image." As described herein, various embodiments of the invention address the ability to detect and discriminate between touch-surface signals (represented as a proximity image) resulting from, for example, the types of actions identified in paragraph [0021].

Figure 1:
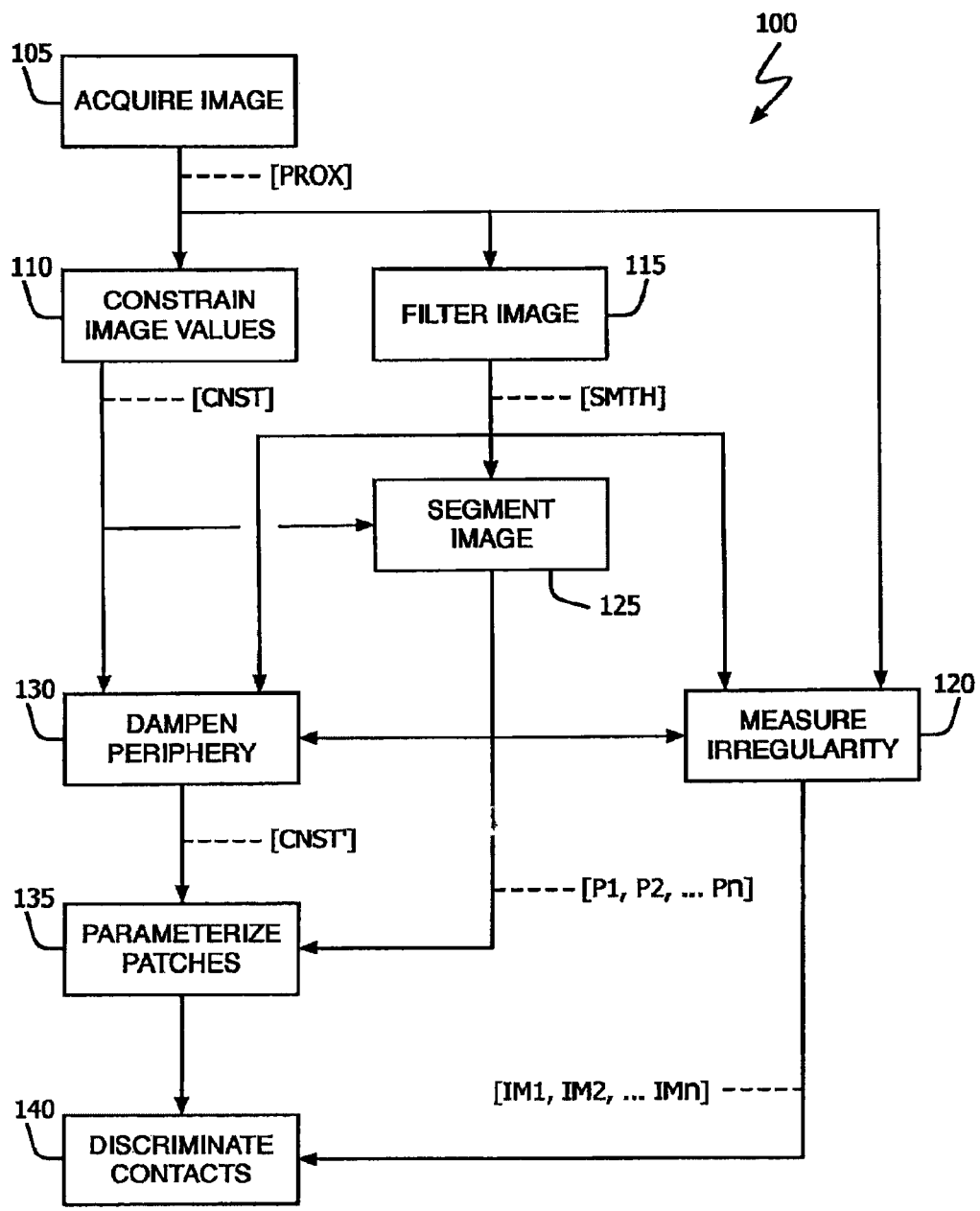
FIG. 1 shows, in flowchart form, a multi-touch processing methodology in accordance with one embodiment of the invention.

Referring to FIG. 1, multi-touch processing methodology 100 in accordance with one embodiment of the invention begins with the acquisition of proximity image data (block 105). Because the acquired data is usually a superposition of information (indicating an object close to or in contact with the touch-surface) fixed offsets (due to circuitry baselines) and noise (e.g., radio frequency interference), an initial adjustment to acquired pixel data may be made to compensate for sensor element baseline activity. For example, on multi-touch device initialization and/or when being brought out of a low-power mode (e.g., sleep), one or more images may be captured. By assuming these initial images include no surface contacts, they may be used to provide the sensor's baseline. Averaging over multiple sequential images (using, for example, infinite or finite impulse response filters) has been found to provide more accurate baseline values. These baseline values may be subtracted from each subsequently captured image to provide a proximity image for use in ongoing image processing steps. In another embodiment, baseline pixel values may be slowly adjusted over time to compensate for temperature or static charge. In addition, the initial baseline values may need to be adjusted if, in fact, touch-surface contacts were present at start-up. In yet another embodiment, a plurality of image samples may be acquired each at a different sensor element driving frequency. For each pixel in these images, the mean or median of subtracted samples (i. e., between the captured baseline and information images) may be combined to create an initial (typically signed) image in accordance with block 105. For noise that occasionally generates large outlier pixel values ("spiky" noise), other rank-order filters may be useful. As noted in FIG. 1, proximity image data resulting from operations in accordance with block 105 is denoted [PROX].

Next, [PROX] image data feeds other processing blocks that may operate sequentially or in parallel with one another (blocks 110, 115 and 120). It has been found that filtering or smoothing a proximity image (block 115) prior to segmentation (block 125) reduces the number of spurious peaks and thus helps reduce over segmentation. In one embodiment of block 115, each pixel value may be averaged with its nearest neighbor pixels in accordance with a discrete diffusion operation If this approach is employed, it has been found beneficial to insert a "border" around the captured image so that there is a value with which to average the pixels at the edge of the captured image. For example, a one (1) pixel border may be added to the [PROX] image—where each "border" pixel is assigned a value corresponding to the image's "background" (e.g., zero). In another embodiment, both temporal (e.g., obtaining multiple images over a period of time) and spatial (e.g., averaging neighbor pixels) smoothing operations may be used. Multiple smoothing operations may be beneficial if the captured pixel data is particularly noisy. As noted in FIG. 1, image data resulting from operations in accordance with block 115 is denoted [SMTH].

While [PROX] image pixel values are typically zero or positive in response to an object contacting the touch-surface (aka, a "grounded" object), background noise or objects close to but not touching the touch-surface (aka "ungrounded" objects) may produce an image some of whose pixel values are negative. Background noise may be static or vary with circuit temperature, touch-surface moisture, or other factors. Noisy, negative pixels can cause excessive jitter in centroid and other patch measurements (see discussion below regarding block 135). To compensate for this, [PROX] image pixel values may be confined to a desired, typically positive, range (block 110). Subtracting the noise threshold helps reduce centroid jitter induced from pixels that wander around (above and below) the noise threshold in successive image frames. As noted in FIG. 1, image data resulting from operations in accordance with block 110 is denoted [CNST]. In one embodiment, all pixels whose values are less than a background noise threshold are set to zero. In another embodiment, a noise-threshold is subtracted from each pixel value and the result is forced to be non-negative, as shown in Table 1.

TABLE 1

Illustrative Pixel Constraint Technique

On a pixel-by-pixel basis:
If [PROX] < (Noise Threshold)
    [CNST] = (Background Value)
Else
    [CNST] = [PROX] − (Noise Threshold)

In one embodiment, the noise-threshold value is set to between 1 and 3 standard deviations of the noise measured at each pixel and the background-value is set to zero. One skilled in the art will recognize that other values are possible and that the precise choice of values depends, inter alia, on the type of sensor element used, the actual or expected level of pixel noise and the multi-touch device's operational environment For example, the noise threshold may be set to a specified expected value on a per-pixel basis or a single value may be used for all pixels in an image. In addition, pixel noise values may be allowed to vary over time such that thermal and environmental effects on sensor element noise may be compensated for.

Touch-surface contacts typically show up as grouped collections of "active" pixel values, where each region of fleshy contact (e.g. finger, palm, cheek, ear or thigh) is represented by a roughly elliptical patch of pixels.

By analyzing an image's topography, image segmentation operations can identify distinct pixel patches that correspond to touch-surface contacts (block 125). In one embodiment, bottom-up, ridge-hiking algorithms may be used to group pixels that are part of the same watershed around each peak pixel—each watershed group or pixel patch corresponds to a touch-surface contact. In another embodiment, top-down search algorithms may be used to identify pixel patches surrounding each peak pixel, starting from the peak, searching outward and stopping at valleys. As part of the image segmentation process, one-dimensional patches may be culled from the identified patches in that they generally result from isolated noise spikes or failure of an entire row or column of sensor elements and/or associated circuitry. In addition, because large contacts such as palms and elongated thumbs may produce multiple peaks in a proximity image (due to noise or non-uniform signal saturation, for example), multiple peaks in the image can grow into multiple, split patches. To account for this phenomenon, multiple detected patches may be merged to produce a reduced number of patches for further processing. Heuristic or empirically determined rules may, for example, be applied to accomplish this. For example, two separately identified patches may be merged when the saddle point along their shared border is not "very deep"— e.g., when the saddle magnitude is more than 60% to 80% of the two patches' peak pixel values. As noted in FIG. 1, identified patches resulting from operations in accordance with block 125 are denoted [P1, P2, Pn].

Analysis shows that noise from pixels on the periphery of a patch, far from the center or peak pixel, can cause more jitter in calculated centroid (center-of-'mass') measurements than the same amount of noise from central pixels. This phenomenon applies to other statistically-fitted patch parameters such as major/minor radii and orientation as well. This jitter can be a particularly serious problem for the smooth tracking of hovering objects because hovering objects do not generally induce strong central pixels, leaving the peripheral pixels with even greater influence on the centroid measurement. However, completely leaving these peripheral pixels out of a patches' centroid calculations would discard potentially useful information about the position, size, and shape of the patch. It is further noted that performing patch parameterization on diffused images may reduce noise from peripheral pixels, but standard spatial filtering processes also cause swelling and distortion of patch shape, cause adjacent patches to spread into one another and other effects that bias centroid and ellipse radii measurements in particular. Thus, a technique is needed that minimizes the amount of noise from patch periphery pixels without strongly distorting patch shape and ensuing measurements.

In accordance with one embodiment of the invention, therefore, patch peripheral pixel values may be selectively reduced, down-scaled or dampened (block 130). Generally, patch centroid determination may be improved by selectively down-scaling patch peripheral pixels that are fairly weak and whose neighbors are very weak. More specifically, in one embodiment calibrated image pixel values (e.g., in [CNST]) whose corresponding smoothed value (e.g., in [SMTH]) falls within a specified range defined by a lower-limit and an upper-limit are reduced in proportion to where the smoothed value falls within that range. Lower and upper limits are chosen empirically so that only those pixel values that are relatively weak (compared to patch peak values and background noise) are manipulated. It has been found that: if the lower-limit is set too low, the patch will "bloom" from background pixels that happen to have positive noise; if the lower-limit is set too high, the patches' centroid position will have a spatially periodic bias toward sensor element centers (e.g., capacitive electrode plate centers); if the upper-limit is not sufficiently higher than the lower-limit, periphery dampening will not provide any significant centroid jitter reduction benefits; and if the upper-limit is too high, all patch pixels besides the patches' peak pixel will be affected, again biasing determination of the patches' centroid toward sensor element centers. In accordance with one embodiment of the invention, the lower-limit is set, on a pixel-by-pixel basis, to approximately twice the background noise standard deviation and the upper-limit is set to approximately four times the background noise standard deviation (with the background value typically being zero). In another embodiment, the lower-limit is set to a value indicative of the "average" or "expected" noise across all pixels in the proximity image. In some embodiments, the noise value may change dynamically to reflect changing operational conditions (see comments above). As noted in FIG. 1, an image whose peripheral patch pixels have been dampened in accordance with block 130 is denoted [CNST']. In one embodiment, peripheral patch pixels are dampened as shown in Table 2.

TABLE 2

Illustrative Peripheral Patch Pixel Dampening

For each pixel in a patch:
If [SMTH] < (Lower Limit)
 [CNST'] = (Background Value)
Else If [SMTH] > (Upper Limit)
 [CNST'] = [CNST]
Else $$[CNST'] = \frac{[SMTH] - \text{Lower Limit}}{\text{Upper Limit} - \text{Lower Limit}} \times [CNST]$$

Patch peripheral pixel dampening such as described above is equally applicable to touch-surfaces that provide one-dimensional proximity images. For example, projection scan touch-surfaces provide an output value (or signal) for each row and column of sensor elements in a touch-surface. In these types of touch-surfaces, a "patch" comprises a plurality of values, where each value represents a row or column measurement. The values at the ends of these patches (i.e., the peripheral values) may benefit from noise dampening as described here.

For certain touch-surface input devices such as a telephone, the ear and earlobe may contact the touch-surface sooner or more often than the cheek during calls. Unfortunately, earlobe patches can be very close in size to finger and thumb patches—but should, nevertheless, not cause spurious finger-button activations during a call. In accordance with one embodiment of the invention, a measurement of patch irregularity is defined that does not look for any specific ear (patch) shape, but rather indicates a general roughness, non-roundness or folds in the pixel patch (block 120). That is, if a patches' irregularity measure is above a specified threshold, the contact is identified as an irregular object (e.g., not a cheek, finger or palm), otherwise the patch is identified as not an irregular object (e.g., a cheek, finger or palm)

Figure 2:
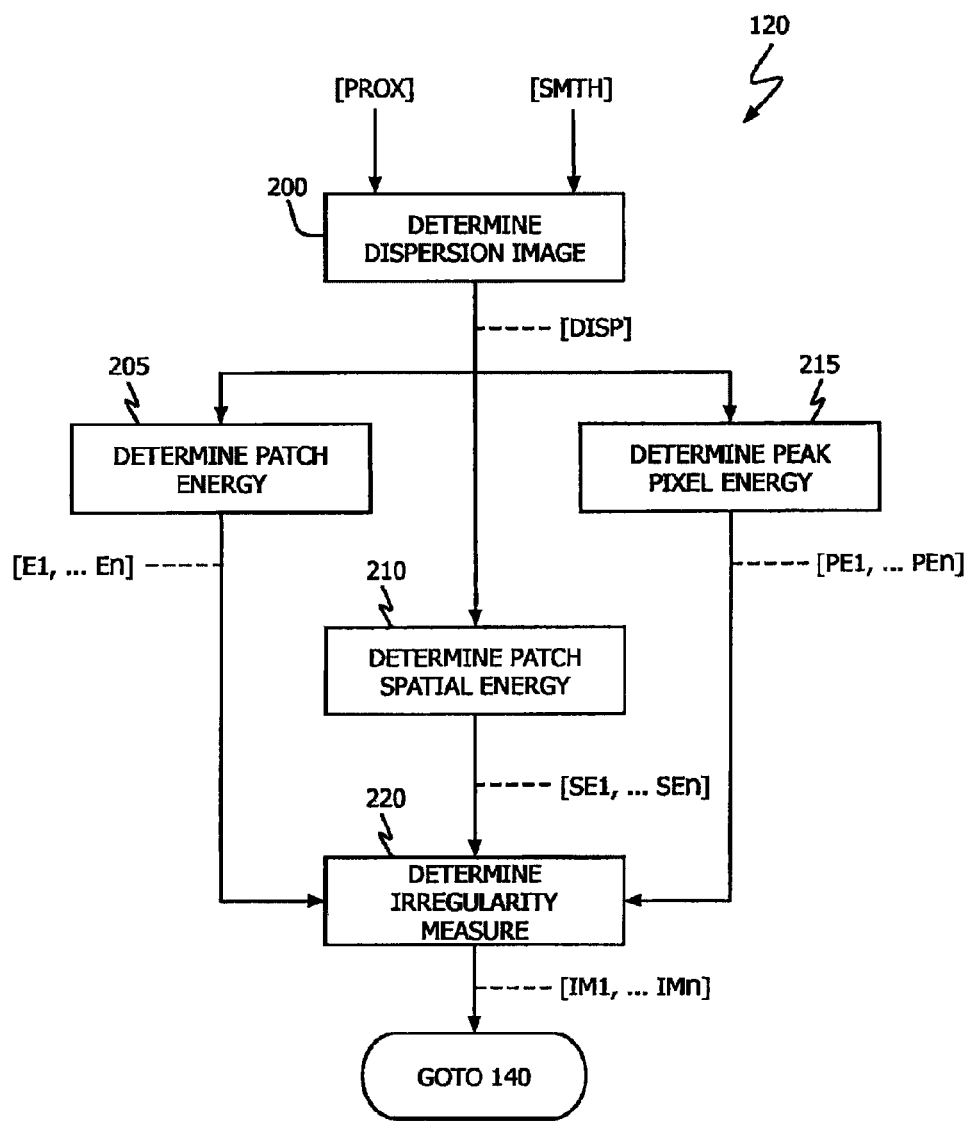
FIG. 2 shows, in flowchart form, a patch irregularity calculation in accordance with one embodiment of the invention.

Referring to FIG. 2, patch irregularity determination methodology 120 begins with the computation of a dispersion image (block 200). In general, the dispersion image (denoted [DISP] in FIG. 2) may be any high-pass filtered version of the initial proximity image [PROX]. In one embodiment, the [DISP] image is generated using a form of unsharp masking as follows:

$$[DISP] = [PROX] - [SMTH] \quad \text{EQ. 1}$$

Next, the total energy for each patch [P1, P2, Pn] is computed (block 205). In one embodiment, for example, a patches' total energy may be calculated by summing the square of each pixel value in the patch. This may be expressed mathematically as follows:

$$\text{Total Energy in Patch } p = E_p = \sum_{i,j \text{ in } p} [DISP_{[i][j]}^2] \quad \text{EQ. 2}$$

As noted in FIG. 2, total patch energy values resulting from operations in accordance with block 205 are denoted [E1, ... En].

The total energy between adjacent pixels in a patch is then determined (block 210). To reduce the effect of energy spikes for pixel patches straddling an edge, the summations below should neglect (i.e., assume a value of zero) contributions from pixels whose neighboring pixels are at the image's border, see EQ. 3. For the same reason, the summations below should ignore contributions from pixels whose neighboring pixels are from a different patch.

$$\begin{aligned}\text{Total Spatial Energy for Patch } p &= SE_p \\ &= \left( \begin{aligned} &\sum_{i,j \text{ in } p} \left( \frac{[DISP_{[i][j]}] -}{[DISP_{[i+1][j]}]} \right)^2 + \\ &\sum_{i,j \text{ in } p} \left( \frac{[DISP_{[i][j]}] -}{[DISP_{[i-1][j]}]} \right)^2 + \\ &\sum_{i,j \text{ in } p} \left( \frac{[DISP_{[i][j]}] -}{[DISP_{[i][j+1]}]} \right)^2 + \\ &\sum_{i,j \text{ in } p} \left( \frac{[DISP_{[i][j]}] -}{[DISP_{[i][j-1]}]} \right)^2 \end{aligned} \right) \div 4 \end{aligned} \quad \text{EQ. 3}$$

The sum is divided by 4 because each pixel gets counted once for each direction in the proximity image (left, right, up and down). As noted in FIG. 2, total patch spatial energy values resulting from operations in accordance with block 210 are denoted [SE1, SEn]. Next, the energy associated with each patches' peak pixel is determined (block 215) as follows:

$$\text{Peak Energy for Patch } p = PE_p = \max_{i,j \text{ in } p} ([DISP])^2 \quad \text{EQ. 4}$$

As noted in FIG. 2, peak patch energy values resulting from operations in accordance with block 215 are denoted [PE1, PEn].

$$\text{Irregularity Measure for Patch } p = IM_p \quad \text{EQ. 5}$$
$$= \frac{SEp - PEp}{Ep}$$

Finally, an irregularity measure for each patch is calculated (block 220). In one embodiment, the irregularity measure is defined as the ratio of a patches' spatial energy minus its peak energy to the patches' total energy:

In another embodiment, the irregularity measure may be based on the proximity image as a whole. That is, the entirety of the dispersion image (i.e., all pixels) may be treated as a single "patch" for purposes of generating an irregularity measure value. One benefit to this approach is that abnormal touch-surface surface conditions may be detected, and responded to, prior to segmentation operations in accordance with block 125 (see FIG. 1). Illustrative abnormal touch-surface surface conditions include, but are not limited to, liquid (e.g., water or sweat) on the touch-surface or multiple irregular objects in close proximity to or in contact with the touch-surface (e.g., coins and/or keys). When these conditions are detected, it may be beneficial to acquire new sensor element baseline values. In addition, if multiple touch-surface sensor sampling frequencies are employed an irregularity measure may be computed at each of the frequencies. If one or more of the computed irregularity measure values is greater than a specified threshold as discussed above, the sampling frequencies associated with the above-threshold values may be deemed to be affected by an excessive amount of noise and ignored (e.g., radio frequency noise). Periodic determination of frequency-dependent irregularity measures in this manner may be used to detect when such noise sources occur and when they disappear. For example, due to a touch-surface devices operating environment changes.

In general, an oddly shaped collection of pixels (i.e., a patch) can require a relatively large set of numbers to define its boundary and signal value at each pixel within the patch. To reduce the computational complexity of identifying, distinguishing and tracking touch events, however, it is advantageous to characterize patches identified in accordance with block 125 with as few numbers as practical. Because most patches from flesh contact tend to have an elliptical shape, one approach to patch parameterization is to fit an ellipse to each patch. One benefit of this approach is that an ellipse is completely described by a relatively small collection of numbers—its center coordinates, major and minor axis lengths, and major axis orientation.

Referring again to FIG. 1, using this approach known centroid or center of-mass computations may be used to parameterize each patch (block 135). In general, a patches' centroid may be determined using these techniques and the [CNST'] image (see block 130). In addition, the [CNST'] image may be used to generate patch covariance matrices whose Eigenvalues identify a patches' major and minor radii and whose Eigenvectors identify the patches' orientation. For contact discrimination operations (see discussion below regarding block 140), the following patch characteristics are also computed:

$$\text{Total Signal for Patch } p = \sum_{i,j \text{ in } p} [CNST_{[i][j]}] \quad \text{EQ. 6}$$

$$\text{Signal Density for Patch } p = \frac{(\text{Total Signal for Patch } p)}{(\text{Geometric Mean Radius of Patch } p)} \quad \text{EQ. 7}$$

In another embodiment, patch signal density may be approximated by:

$$\text{Signal Density for Patch } p = \frac{\text{(Total Signal for Patch } p)}{\text{(Number of Pixels in Patch } p)} \qquad \text{EQ. 8}$$

$$\text{Patch Eccentricity} = \frac{\text{(Patch Major Axis)}}{\text{(Patch Minor Axis)}} \qquad \text{EQ. 9}$$

Prior art techniques to discriminate between objects that actually contact a touch-surface from those that are merely hovering above it have relied upon a patches' total signal parameter (see, for example, EQ. 6). This approach, however, is very dependent upon the size of the object being identified. That is, prior art techniques that threshold on a patches' total signal value generally only work well for objects of a single size. For example, a total patch signal threshold selected to identify a fingertip contact could trigger detection of a thumb or palm when those objects are far above the touch-surface. Such a situation can lead to the mis-activation of keys, buttons or other control elements, the activation of control elements prior to surface contact and the mis-identification of patches (e.g., identifying a patch actually caused by a palm as a thumb).

In contrast, a discrimination technique in accordance with one embodiment of the invention uses a patches' signal density parameter (see, for example, EQs. 7 and 8). It has been found that this approach provides a robust means to distinguish objects that contact the touch-surface from those that are held or hovering above the surface—regardless of the object's size. For instance, the same density threshold can discriminate surface contact for fingers (adult and children), thumbs, palms and cheeks.

If the patch signal density parameter is normalized such that a firm fingertip contacting the touch-surface produces a peak value of 1, then a lightly brushing contact typically produces values slightly greater than 0.5 (e.g., half the normalized value) while a hovering object would produce a patch density value generally less than 0.5. It will be recognized that what constitutes "slightly greater" or "slightly less" is dependent upon factors such as the type of sensor elements used and their physical layout. Accordingly, while the precise determination of a threshold value based on patch signal density will require some experimentation, it would be well within the purview of an artisan of ordinary skill with benefit of this disclosure.

It has also been determined that fingernail touches produce patch signal density values generally less than approximately 0.5. This is because the nonconductive fingernail holds the conductive finger flesh more than approximately 1 millimeter above the touch-surface. Accordingly, a threshold operation based on patch signal density is also a reliable means for discriminating between fleshy fingertip touches and back-of-fingernail touches.

With patch parameterization complete, the various types of touch-surface contacts may be distinguished (block 140). Using the parameters identified above, it is possible to robustly and reliably distinguish large objects (e.g., cheeks and palms) form other objects (e.g., fingers and thumbs), irregular objects (e.g., ears) from regular objects (e.g., fingers, thumbs, cheeks and palms) and finger-clasp actions (e.g., when a user claps a multi-touch touch-surface device to put it into or withdraw it from a pocket). Identification of and discrimination between these types of touch-surface inputs permits an associated device to be controlled in a more robust manner. For example, in one embodiment detection of a large object may be used to transition the device from one operational state (e.g., off) to another (e.g., on). In another embodiment, input identified as the result of a large or irregular object, which might normally cause a state transition, may be safely ignored if in one or more specified states. For example, if a touch-surface telephone is already in an "on" or "active" state, identification of a large or irregular object may be ignored.

Figure 3:
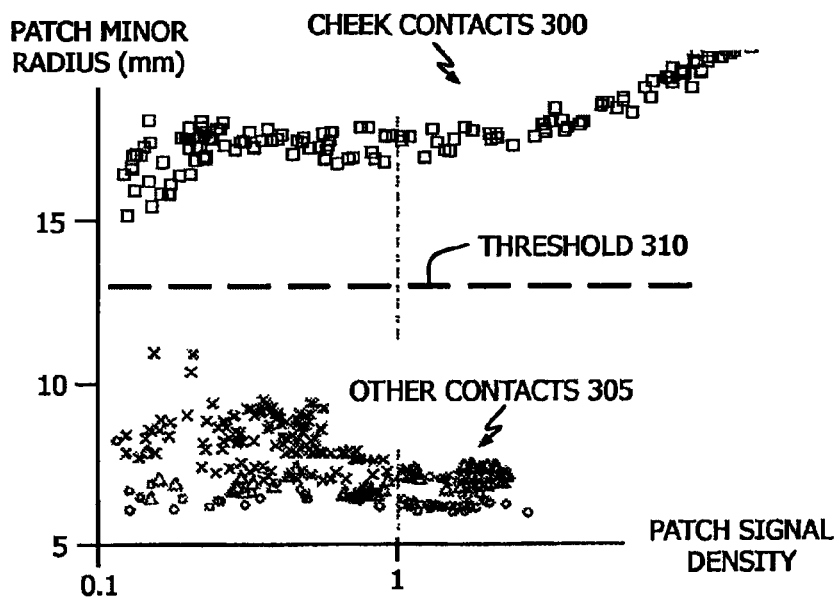
FIG. 3 shows an example plot of empirically determined data illustrating patch minor radii's ability to discriminate between large touch-surface contacts (cheeks, for example) and other touch-surface contacts (fingertips and thumbs, for example).

As previously noted, it can be advantageous to distinguish large objects (e.g., cheeks and palms) from small objects (e.g., fingertips), regardless of whether the objects are hovering a few millimeters above the touch-surface or are pressed firmly against the surface. It has been found that a contact's minor radius measure provides a robust discriminative measure to accomplish this. If a patches' minor radius exceeds a specified threshold, the contact can reliably be classified as a cheek—as opposed to a finger or thumb, for example. This same measurement can also detect a nearby leg (e.g., thigh) through a few millimeters of fabric (e.g. when a device is inserted in the pocket with its touch-surface facing the body). This measurement has been found to be so robust that if other patches appear on the surface with smaller minor radii (e.g., from an earlobe), they may be safely ignored. Referring to FIG. 3, illustrative empirical data is shown that illustrates the distinction between cheek contacts 300 and other contacts 305 (e.g., fingertips and thumbs) based on patch minor radii. While the exact values for patch contacts may vary from sensor to sensor and population to population, it is clear from FIG. 3 that threshold 310 may be made anywhere between approximately 11 millimeters and approximately 15 millimeters. (In this and the following data plots, patch signal density values are normalized to 1 for a fully contacting fingertip.) While threshold 310 is described by a constant value (i.e., dependent only upon patch minor radius), this is not necessary. For example, threshold 310 may be described by a linear or non-linear relationship between multiple parameters such as patch minor-radius and patch signal density (see discussion below regarding FIG. 4).

A similar size testing may be performed using a patches' major or geometric mean radius $\sqrt{\text{(patchmajoraxisradius)(patchminoraxisradius)}}$, the minor-radius discrimination described here has been found to be superior because it is better able to discriminate between thumbs or flattened fingers. (Flattened fingers may produce major radii as large as a cheek major radius, but their minor radii are typically no larger than a normal fingertip touch.)

Figure 4:
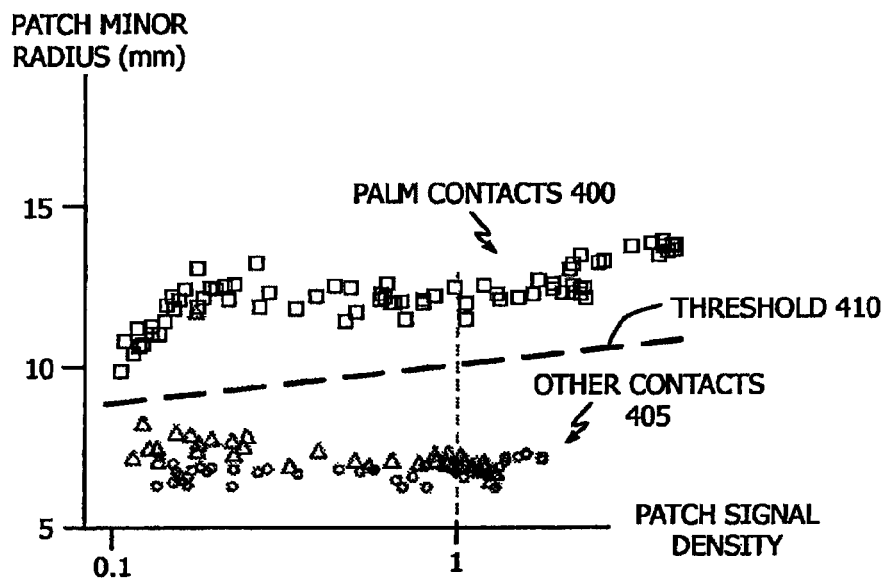
FIG. 4 shows an example plot of empirically determined data illustrating patch minor radii's ability to discriminate between palm contacts and other touch-surface contacts (e.g., fingertips and thumbs).

It will be recognized that distinguishing a palm contact from fingertip or thumb contacts can be especially difficult because the patch radii resulting from a palm contact for people with small hands may approach the patch radii caused by thumb or fingertip contacts for people with large hands. These types of contacts may also be distinguished in accordance with the invention using the patch minor radius parameter. Referring to FIG. 4, illustrative empirical data is shown that illustrates the distinction between palm contacts 400 and other contacts 405 (e.g., fingertips and thumbs) based on patch minor radii. It has been found that patch signal density values tend to be low for hovering contacts of any size, and saturate at a level independent of object size as the object presses firmly onto the touch-surface. Thus, the palm versus other object decision threshold 410 may be reduced for contacts with lower signal density because hovering or lightly touching fingers produce lower minor radii than firmly touching fingers, whereas palms tend to produce large minor radii even when hovering. Accordingly, decision threshold 410 may be represented by a straight curve with a small positive slope. While the exact values for patch contacts will vary as noted above, it is clear from FIG. 4 that threshold 410 may be made to distinguish palm contacts from other contacts. Using this approach, there is virtually no risk that a hovering palm (a contact that typically produces a patch signal density value similar to that of a touching finger) will mistakenly be interpreted as a cursor move or button activation (e.g., a "click" event).

Figure 5:
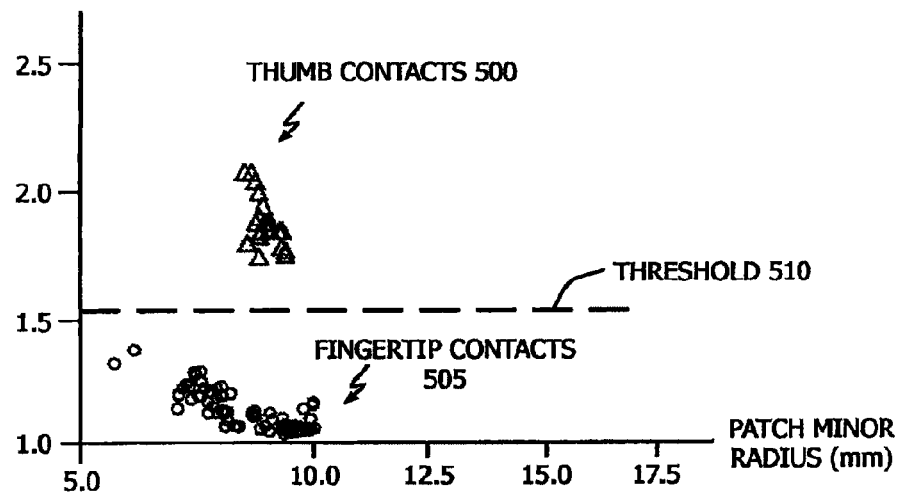
FIG. 5 shows an example plot of empirically determined data illustrating the use of patch eccentricity to distinguish thumb contacts from fingertip contacts.

Referring to FIG. 5, one technique in accordance with the invention uses patch eccentricity (see EQ. 9) to distinguish fingertip contacts from thumb contacts (shown as "other contacts in FIGS. 3 and 4). As shown, in one embodiment thumb contacts 500 may be easily distinguished from fingertip contacts 505 via constant threshold 510. In another embodiment, thumb and fingertip contacts may be distinguished based on a linear or non-linear function. It has been found that fingertips typically have eccentricity values between 1.0 and 1.5 while thumbs have eccentricity values greater than 1.5. The use of eccentricity in this manner has unexpectedly been found to be more reliable in correctly identifying thumbs then prior art techniques (which typically use total signal and separation angles between other fingers).

It will be noted that FIG. 5 includes only thumb and fingertip contacts. This implies that larger contacts such as cheeks (see FIG. 3) and palms (see FIG. 4) have already been identified and, therefore, removed from consideration. In accordance with another embodiment of the invention, minor radius may be used to first discriminate large contacts 600 (e.g., cheeks 300 and palms 400) from thumb contacts 500 and fingertip contacts 505 with first threshold 605. In still another embodiment, the threshold separating thumbs and fingertip contacts from large contacts may be linear or non-linear. Thumb contacts 500 may then be distinguished from fingertip contacts 505 via threshold 510 in accordance with FIG. 5. While the exact value of thresholds 510 and 605 will be implementation dependent, they will nevertheless be straight-forward to determine by one of ordinary skill in the art having the benefit of this disclosure.

Being able to distinguish thumbs from other fingertips allows a larger number of input patterns (e.g., finger/thumb motions across a device's multi-touch touch-surface) to be uniquely recognized. For example, the motion of a fingertip across a touch-surface in a first pattern (e,g., a circle) may generate an action in accordance with a first command, while that same gesture using a thumb could result in a different action. Being able to distinguish thumbs from other fingertips also permits one to identify a cluster of contacts as left-handed or right-handed. That is, if the identified thumb contact is left of cluster center, this indicates a contact from fingers of a right hand. Similarly, if the identified thumb contact is right of cluster center, this indicates a contact from the fingers of a right hand. This knowledge may, in turn, be used to enlarge the number of distinct commands a user may generate from hand input. For example, a given contact pattern using the right hand may effect a first action (e.g., open a file), while the same pattern using the left hand may effect a second action (e.g., close a file).

Figure 7:
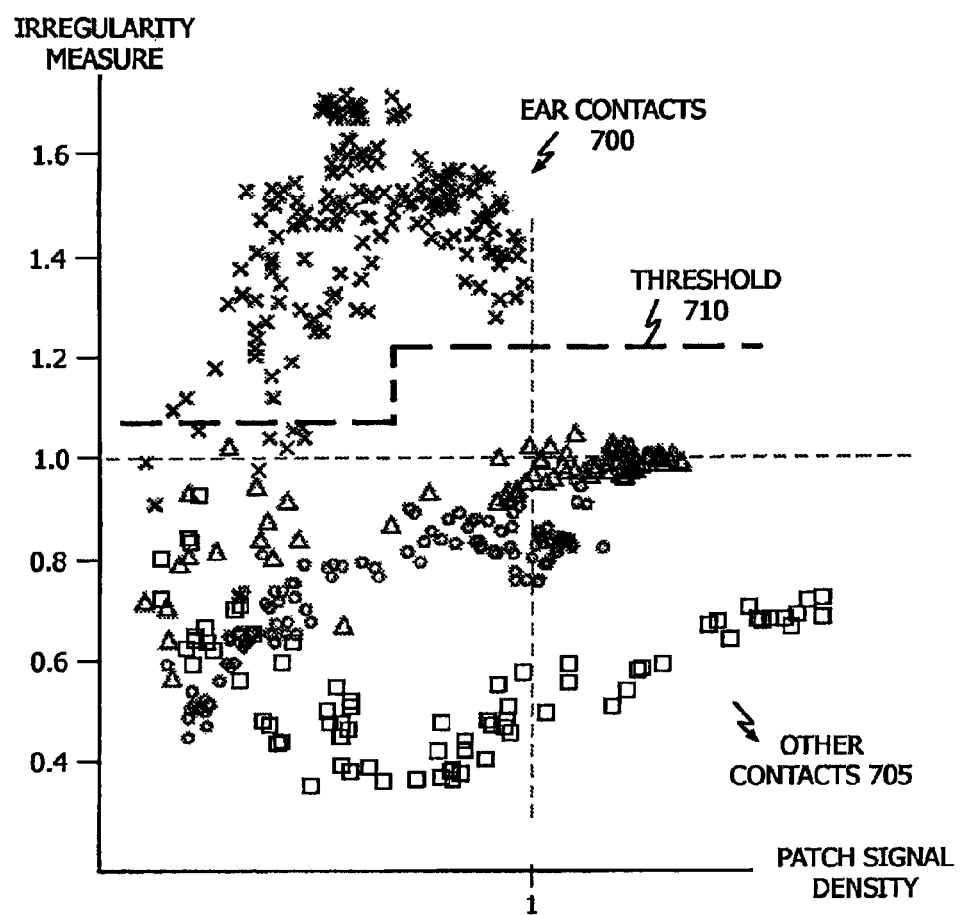
FIG. 7 shows a plot of empirically determined data illustrating a patch irregularity measure's ability to discriminate between ear contacts and other touch-surface contacts (e.g., fingertips, thumbs and cheeks).

Ear and earlobe contacts can generate patches that are roughly the same size as those generated by fingers and thumbs. It has been found, however, that the creases, ridges, and generally rough topography of the ear do produce proximity images unique from fingers and thumbs, at least if the imaging sensor (i.e., touch-surface) covers a significant portion of the ear (i.e. not just the fleshy lobule). The irregularity measure described above is one way to characterize contact roughness (see EQ. 5). This permits a robust means to discriminate between contacts due to ears and earlobes from contacts due to fingers, thumbs, cheeks, thighs and palms. It has been found that the defined irregularity measure tends to give values between 1.0 to 2.0 for ear and earlobe contacts while regular (e.g., smooth) contacts attributable to fingers, thumbs, palms and cheeks give values less than about 1.0. Referring to FIG. 7, illustrative empirical data is shown that illustrates the distinction between ear contacts 700 and other contacts 705 (e.g., fingertips, thumbs and cheeks) based on the above defined irregularity measure. In one embodiment, threshold 710 comprises a linear step-like or spline structure with a first level at an irregularity measure of between approximately 1.0 to 1.2 and a second level at approximately between 1.1 and 1.2. In another embodiment, a single linear function having a positive slope may be used. In yet another embodiment, higher level functions may be used to segregate the various contact types. As noted above, while the exact values for patch contacts may vary from those shown in FIG. 7, it is clear that most rough object contacts may be distinguished from most smooth or regular object contacts using the defined irregularity measure—where the exact nature or form of a decision threshold (e.g., threshold 710) is dependent upon the precise implementation, operational goals and capabilities of the target multi-touch device.

Figure 6:
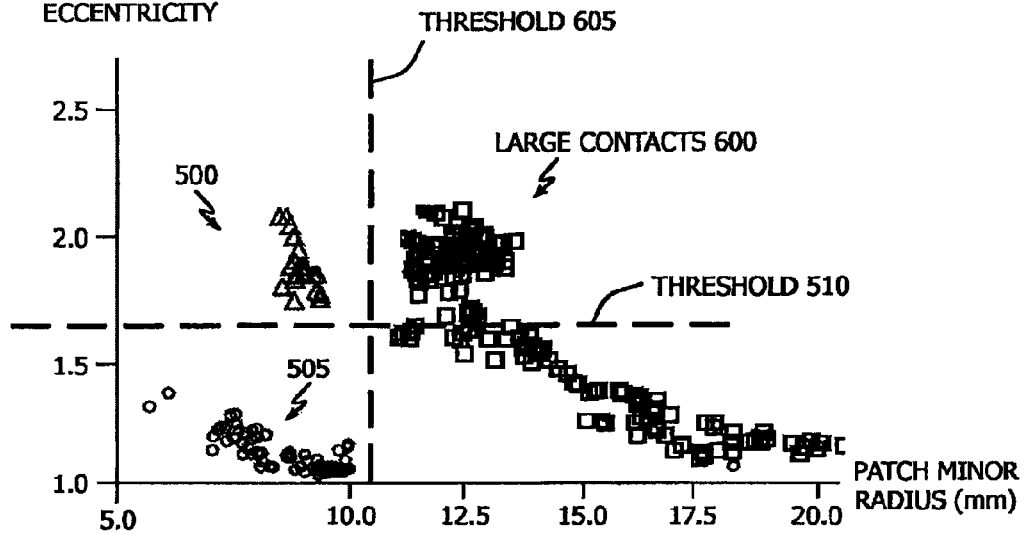
FIG. 6 shows an example plot of empirically determined data illustrating the use of patch eccentricity to distinguish large contacts (e.g., cheeks and palms) from small contacts (e.g., thumbs and fingertips) and, further, to distinguish between thumb contacts from fingertip contacts.

In one embodiment, successive proximity images (aka "frames") are used to track objects as they move across a touch-surface. For example, as an object is moved across a touch-surface, its associated patch(es) may be correlated through overlap calculations. That is, patches identified in successive images that overlap in a specified number of pixels (or fraction of patch pixels) may be interpreted to be caused by the same object In such embodiments, the maximum patch minor radius over the life of the tracked contact may be compared to the thresholds discussed above (e.g., thresholds 310 in FIG. 3, 410 in FIG. 4, 510 in FIG. 5, 605 in FIGS. 6 and 710 in FIG. 5). This approach ensures that a palm contact, for example, does not lose its palm identity should its minor radius temporarily fall below the decision threshold (e.g., 410). It is further noted that if a decision threshold is not a constant value (e.g., 310) but rather some curve (e.g., 410 and 710), it may be advantageous to apply a density-correction to the instantaneous minor radius prior to the maximum minor radius accumulation operation described here.

When taking a multi-touch device in and out of a pocket, or otherwise generally handling it, users should have the freedom to clasp their hand around it without producing spurious input Such finger-clasps can be detected via any one of the following criteria:

Identification (via block 125 in FIG. 1) of five, six or more distinct surface contacts. (For a touch-surface the size of a deck of cards, this many fingertips won't normally fit on the surface, but since the phalange joints of each flattened finger may get segmented into more than one contact patch, two or three flattened fingers may generate five or more contact patches.)

Two, three or more contact patches are identified and the major radius of at least two exceed approximately 15 millimeters to 18 millimeters. Since cheeks and other large body parts normally produce just one patch with large major radius, the requirement for two or three large patches prevents this test from triggering on a cheek, leg or chest Also, the requirement for multiple large major radii prevents this test from triggering on a couple fingertips accompanied by a long thumb laid flat against the surface.

In another embodiment of the invention, multi-touch processing methodology may include far-field processing. As used herein, far-field processing refers to the detection and processing associated with bodies (e.g., fingers, palms, cheeks, ears, thighs, . . . ) that are close to (e.g., less than one millimeter to more than a centimeter) but not in contact with the touch-surface. The ability to detect far-field objects may be beneficial in touch-surface devices that, during normal use, are brought into close proximity to a user. One example of such a device is a telephone that includes a touch-surface for user input (e.g., dialing).

Figure 8:
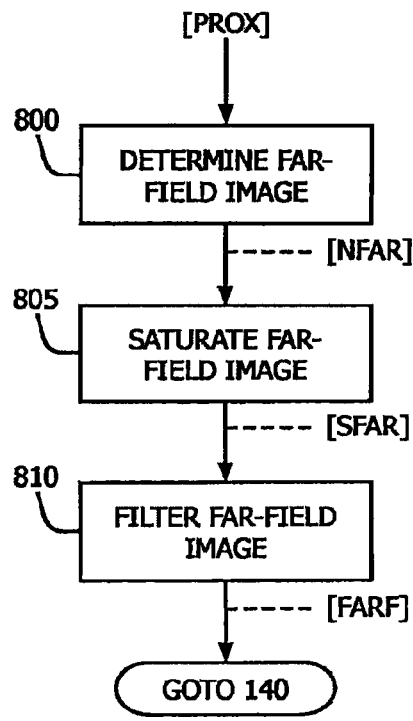
FIG. 8 shows, in flowchart form, far-field operations in accordance with one embodiment of the invention.

Referring to FIG. 8, in one embodiment initial far-field processing may be performed after proximity image data is acquired. That is, after operations in accordance with block 105 in FIG. 1. If the far-field measurement is designed to remain negative in the absence of any object near the touch-surface, and only become positive in the presence of a large object, a first step subtracts a small noise factor from the initially acquired proximity image to create a negative-background far-field image (block 800):

Negative Far-Field Image=[PROXJ−(Noise Factor)    EQ. 10

In one embodiment, the noise factor may be set to between approximately 1 and 2 standard deviations of the average noise measured or expected over the entire image. This will cause most pixels in the resulting negative far-field image to be slightly negative rather than neutral in the absence of any touch-surface contact As noted in FIG. 8, the negative far-field image resulting from operations in accordance with block 800 is denoted [NFAR].

Next, each pixel in the [NFAR] image is saturated to the highest level expected from an object hovering a few millimeters from the touch-surface (block 805). In one embodiment, the resulting far-field saturation image (denoted [SFAR] in FIG. 8) is generated as shown in Table 3.

TABLE 3

Illustrative Far-Field Saturation Operations

For each pixel in the initial far-field image:
If [NFAR] > (Far-Field Saturation Limit)
    [SFAR] = (Far-Field Saturation Limit)
Else
    [SFAR] = [NFAR]

Since one goal of far-field operations is to be sensitive to large numbers of pixels only slightly activated (e.g., having small positive values), without being overwhelmed by a few strongly active pixels (e.g., having large positive values), the saturation limit value should be less than the peak pixel value from fingers or thumbs hovering within approximately 1 to 2 millimeters of the touch-surface, but not so low as to cause the resulting [SFAR] image to lose to much information content While the precise far-field saturation limit value will vary from implementation to implementation (due to differences in sensor element technology and associated circuitry), it has been determined empirically that a suitable value will generally lie between +3 standard deviations and +6 standard deviations of noise associated with the initial far-field image. (Again, this noise may be on a per-pixel, or whole image basis.)

If the initial proximity image [PROX] contains a significant amount of noise, it may be beneficial to filter the [SFAR] image (block 810). In one embodiment, a finite impulse response filter technique may be used wherein two or more consecutive [SFAR] images are averaged together. In another embodiment, an infinite impulse response filter technique may be used to generate a smoothed image. It will be recognized that an infinite impulse response filter generates a weighted running average (or auto-regressive) image. In one embodiment, for example, an infinite impulse response filter combines the current far-field saturated image (e.g., [SFAR] new) with the immediately prior far-field saturated image (e.g., $[SFAR]_{prior}$) in a one-third to prior, two-thirds ratio. As noted in FIG. 8, a filtered far-field saturated image generated in accordance with block 810 is denoted [FARF].

Following image segmentation operations in accordance with block 125 (see FIG. 1), a weighted average of non-linearly scaled background pixel values may be used to generate a scalar far-field indicator value (FAR-FIELD) in accordance with the invention as follows:

$$\text{FAR-FIELD} = \frac{\sum_{background\ i,j} ENeg([FARF]_{[i][j]}) \times [LOC_{[i][j]}]}{\sum_{background\ i,j} [LOC_{[i][j]}]} \quad \text{EQ. 11}$$

where the ENeg( ) function non-linearly amplifies pixel values below a threshold (e.g., zero) and [LOC] represents a pixel weighting mechanism. As indicated in EQ. 11, only proximity image background pixels contribute to the computed FAR-FIELD value. That is, pixels identified as belonging to a patch during image segmentation operations are excluded during far-field measurement operations.

In one embodiment, the ENeg0 function disproportionately emphasizes the contributions from background pixels as follows:

$$ENeg(\text{pixel value}) = \begin{cases} \text{pixel value} & \text{for } 0 \le \text{pixel value} \le B \\ 2 \times \text{pixel value} & \text{for } (-B \div 2) \le \text{pixel value} < 0 \\ B + (3 \times \text{pixel value}) & \text{for } \text{pixel value} < (-B \div 2) \end{cases} \quad \text{EQ. 12}$$

where B represents a far-field saturation limit value. Empirically determined, B is chosen to permit a small number of negative pixels to cancel out a finger or thumb-sized patch of positive pixels. In this way, only a nearly full coverage cheek-sized patch of positive pixels, plus a small remainder of neutral/background pixels, can produce a strongly positive far-field measurement.

While not necessary, disproportionately emphasizing the contributions from background pixels in accordance with EQs. 11 and 12 permits the FAR-FIELD measurement to be more selective for bodies large enough to positively affect most of a touch-surface's pixel (e.g., cheeks and legs), while not being overly influenced by medium-sized objects (e.g., hovering thumbs). For example, if a hovering thumb causes half of a touch-surface's sensor elements to have a slightly above-background pixel value, disproportionately emphasizing the half that remain below background will keep the measured FAR-FIELD value below zero—indicating no large object is "near" the touch-surface (e.g., within 1 to 3 centimeters). In another embodiment, background pixels may be linearly combined (e.g., summed).

As noted above, [LOC] represents a pixel weighting mechanism. In general, there is one value in [LOC] for each pixel present in the touch-surface. If it is desired to consider all touch-surface pixels equally, each value in the [LOC] image may be set to 1.0 (or some similar constant value). For hand-held form-factors selectivity for large bodies may be improved, however, by lowering the weights near the bottom and side edges (for example, to values between 0.1 and 0.9). Doing this can lessen false-positive contributions from a hand whose fingers wrap around the device during (clasping) operations. In mobile phone form-factors, to retain sensitivity to ear and cheek far-fields, the weights along the top edge (where thumbs and fingers are less likely to hover or wrap) may be kept at full strength.

Returning now to FIG. 1 at block 140, when far-field measurements are taken into account during contact discrimination operations, a FAR-FIELD value greater than a specified threshold (e.g., zero) indicates a large "near by" object has been detected. As previously noted, this information may be used to transition the touch-surface device into a specified mode (e.g., on, off or low power). In addition, far-field measurements may be combined with other measurements (e.g., the irregularity measure) to provide improved ear detection. For example, when a touch-surface is partly against an ear and also hovering a centimeter or two from a cheek, a weak ear pixel patch may be segmented in accordance with block 125 at the top of the screen. Meanwhile, the middle and bottom of the touch-surface would only be affected by the cheek's far-field. Even if the FAR-FIELD measurement as taken outside the ear patch is not strong enough to exceed the specified far-field threshold on its own, the FAR-FIELD value can be added or otherwise combined with (weak) patch density and irregularity measure indicators such that the sum or combination surpasses an ear detection threshold.

In addition, one or more proximity sensors may be positioned above the touch-surface's top edge or around, for example, a telephone's receiver opening. Illustrative proximity sensors of this type include, but are not limited to, active infrared-reflectance sensors and capacitance-sensitive electrode strips. In a mobile telephone form-factor, when the device is held such that the receiver is centered on the ear canal, ear ridges may trigger the proximity sensor. Meanwhile the earlobe may cause a small pixel patch in the top portion of the touch-surface. Discrimination operations in accordance with block 140 could decide that when a pixel patch at the top of the touch-surface is accompanied by any significant receiver proximity trigger, the pixel patch must be an ear, not a finger. In another embodiment, the same conditions but with a significant FAR-FIELD value for the lower portion of the touch-surface (indicating a hovering cheek) may be used to trigger detection of an ear at the top of the touch-surface. Generally speaking, one or more of signal density (see EQs. 7 and 8), patch irregularity (see EQ. 5), FAR-FIELD measurement (see EQ. 11) and proximity sensor input may be combined (e.g., a weighted average) so that ear detection can trigger when multiple indicators are weakly active, or just one indicator is strongly active. Finally, it is noted that contact discrimination parameters such as a patches' centroid, minor axis radius, patch irregularity (EQ. 5), patch signal density (EQs. 7 and 8), far-field (EQ. 11) and proximity sensor input (if available) may be (low-pass) filtered to help counteract their often sporadic nature. This may be particularly beneficial if the filters employ adaptive time constants that rise quickly in response to rising input values, but decay more slowing when input values drop and/or are missing.

Figure 9:
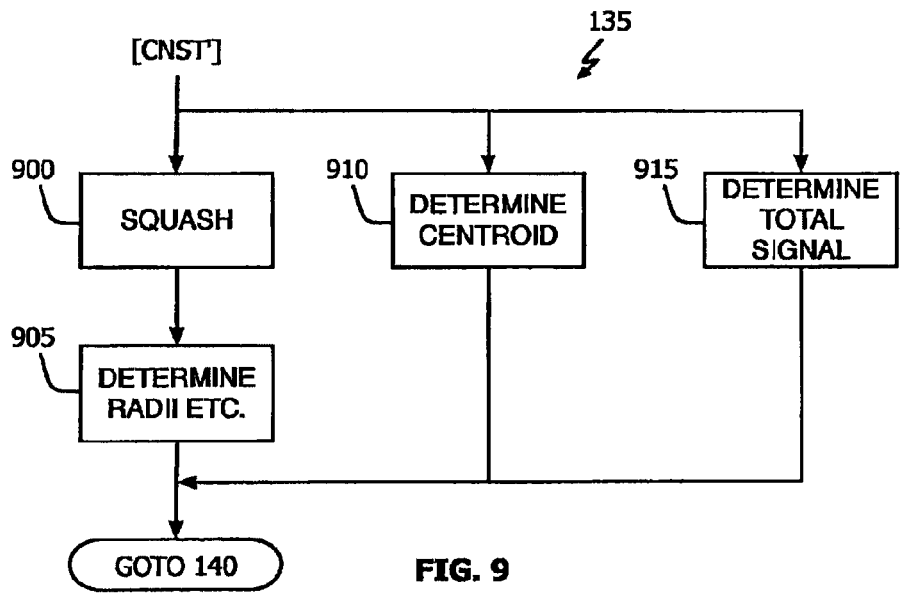
FIG. 9 shows, in flowchart form, a patch parameterization operation using squashed pixel values in accordance with one embodiment of the invention.

In accordance with still another embodiment of the invention, it has been found beneficial to "squash" measured pixel values prior to determining some patch parameters. As used herein, "squashed" means to deemphasize pixel values in a nonlinear fashion. Illustrative squashing functions include the square root, the third root, one-over-the-value-squared, piece-wise linear functions (e.g., splines), etc. Referring to FIG. 9, each pixel in the [CNST'] image is squashed (block 900) prior to being used to generate patch covariance matrices whose Eigenvalues identify a patches' major and minor radii and whose Eigenvectors identify the patches' orientation (block 905). In addition, and as described above, the [CNST'] image is also used to determine patch centroid (block 910) and total signal (block 915) parameters. The parameters generated in this manner may be used in any of the discrimination methods described in connection with block 140 (see FIG. 1)

One benefit of using squashed pixel values in accordance with FIG. 9, is that patch shape and size measurements (e.g. radii) do not become dominated by fully covered central pixels as flesh touches and presses onto the touch-surface. The measurements remain more consistent whether a flesh object is hovering, lightly touching or fully pressed onto the surface. Another benefit of using squashed pixel values in accordance with FIG. 9, is that it tends to simplify the discrimination of certain patches over a range of patch signal densities. For example, when patch radius is computed based on squashed pixel values, palm contacts 1000 are easily distinguished from other contacts 1005 using a constant threshold function 1010. This is in contrast to linear threshold 410 illustrated in FIG. 4. Constant thresholds, in general, are easier and faster to implement than linear or non-linear thresholds. Another benefit of using squashed pixel values in accordance with FIG. 9 is that one may eliminate the density correction to minor radius values prior to thresholding operations as discussed above in connection with FIG. 4.

Figure 11:
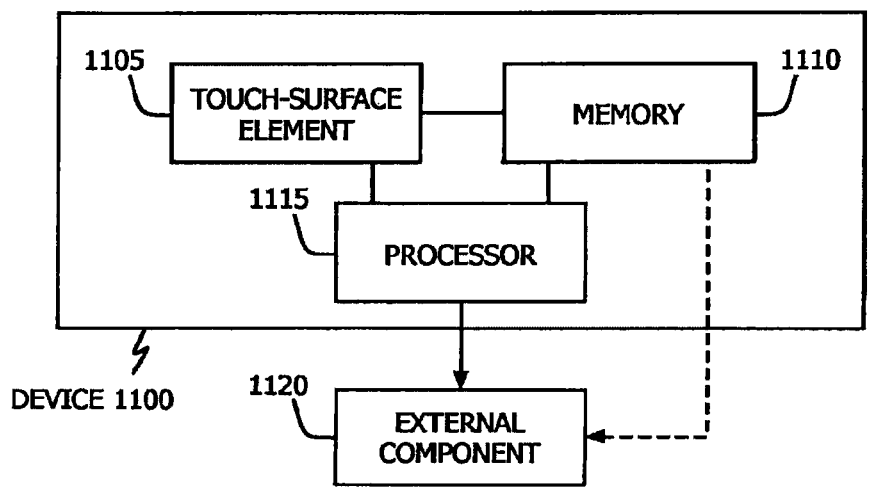
FIG. 11 shows, in block diagram form, a touch-surface device in accordance with one embodiment of the invention.

Referring to FIG. 11, a touch-surface device 1100 of the type described herein is shown in block diagram form. As used herein, a touch-surface device is any device that receives user input from a multi-touch capable touch-surface component (i.e., an input unit that provides user input in the form of a proximity image). Illustrative touch-surface devices include, but are not limited, to tablet computer system, notebook computer systems, portable music and video display devices, personal digital assistants, mobile telephones and portable video and audio players.

As illustrated, touch-surface element 1105 includes sensor elements and necessary drive and signal acquisition and detection circuitry. Memory 1110 may be used to retain acquired proximity image information (e.g., [PROX] image data) and by processor 1115 for computed image information (e.g., patch characterization parameters). Processor 1115 represents a computational unit or programmable control device that is capable of using the information generated by touch-surface element 1105 to determine various metrics in accordance with FIGS. 1, 2, 8 and 9. In addition, external component 1120 represents an entity that uses the generated information. In the illustrative embodiment, external component 1120 may obtain information from processor 1115 or directly from memory 1110. For example, processor 1115 could maintain a data structure in memory 1110 to retain indication of, for example, large body contact status, large body far-field status, irregular object indication status, proximity sensor status (if utilized), flat finger clasp status and normal finger touch status. In one embodiment, each status may be indicated by a single Boolean value (i.e., a flag).

Various changes in the materials, components, circuit elements, as well as in the details of the illustrated operational methods are possible without departing from the scope of the following claims. It will be recognized, for example, that not all steps identified in FIG. 1 need be performed while others may be combined and still others divided into more refined steps. By way of example, in one embodiment patch peripheral pixel noise is not suppressed (see block 130). In another embodiment, patch peripheral pixel noise suppression is employed but no patch irregularity measure is made (see block 120). In still another embodiment, both patch peripheral pixel noise suppression and patch irregularity measures are determined and used.

In yet another embodiment, proximity image pixel values are squashed while in another embodiment, squashed pixel values are not used. When squashed pixel values are used, they may be used to determine patch radius and orientation values only. They may also be used to determine other parameters such as patch density and total patch signal parameters.

Figure 10:
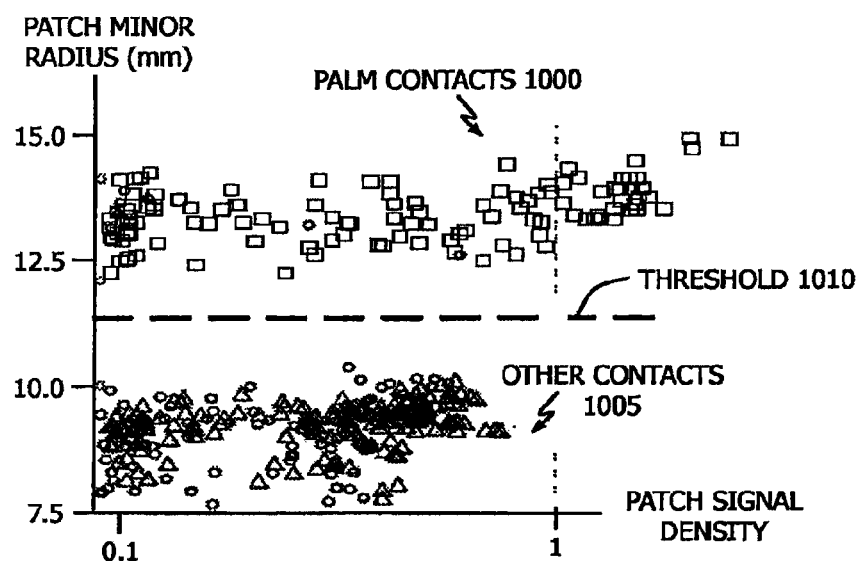
FIG. 10 shows an example plot of empirically determined data illustrating the use of squashed pixel values to distinguish between palm contacts from other types of contacts.

For embodiments that do not employ peripheral patch pixel noise reduction techniques, patch parameterization operations in accordance with block 135 use the [CNST] image and not the [CNST'] image as discussed above (see Table 2). In addition, patch parameterization operations in accordance with block 135 do not need to rely on statistical ellipse fitting. They could instead sum patch perimeter pixels and compare the obtained value to all patch pixels or attempt polygonal fits. Further, calibration operations (see Tables 1 and 2) may be delayed until, or made part of, image segmentation operations (block 125). In addition, it may be beneficial for purposes of image segmentation to mark pixels that are at, or have been set to, the background level (e.g., during operations in accordance with block 110). It is also noted that because the criteria for identifying a finger clasp are orthogonal to large body contact detection (see discussion above in [0051]), flat finger clasps may be used as a distinct gesture commanding a particular operation like locking the screen, going to sleep, or terminating a telephone call. If peripheral patch pixel noise reduction techniques are not used, pixel squashing techniques in accordance with FIGS. 9 and 10 may still be employed using the [CNST] image.

With respect to illustrative touch-surface device 1100, touch-surface element 1105 may incorporate memory (e.g., 1110) and/or processor (e.g., 1115) functions. In addition, external component 1120 may represent a hardware element (e.g., a host processor) or a software element (e.g., a driver utility).

Finally, acts in accordance with FIGS. 1, 2, 8 and 9 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The invention claimed is:

1. A method to discriminate input sources to a touch-surface device, comprising:
   obtaining a proximity image;
   compensating the proximity image for background noise;
   filtering the proximity image to reduce spurious peaks, the filterng being distinct from the compensating;
   segmenting the proximity image to identify a plurality of patches having patch pixel values;
   reducing or down-scaling peripheral patch pixel values for one or more of the plurality of patches based on the compensated proximity image and the filtered proximity image, the reducing or down-scaling being distinct from the compensating and filtering;
   determining an eccentricity value for one or more of the reduced or down-scaled peripheral patch pixel values of the plurality of patches;
   identifying a first patch as a thumb contact when the eccentricity value of the first patch is greater than a first threshold; and
   using the identified patch to control an operation of a touch-surface device.

2. The method of claim 1, further comprising, identifying the first patch as a fingertip contact when the eccentricity value of the first patch is less than the first threshold.

3. The method of claim 2, further comprising using the identified first patch as a fingertip contact to control an operation of the touch-surface device.

4. The method of claim 1, wherein the first threshold of the eccentricity value is between 1.0-1.5.

5. The method of claim 1, wherein the first threshold of the eccentricity value is 1.5.

6. The method of claim 1, wherein the first threshold is a linear function.

7. The method of claim 1, wherein the first threshold is a non-linear function.

8. The method of claim 1, further comprising identifying patches that are larger than thumb contacts, and ignoring the identified larger patches.

9. The method of claim 1, identifying a second patch as a fingertip contact when the eccentricity value of the second patch is less than the first threshold.

10. The method of claim 9, further comprising identifying the first and second patches as associated with a right hand when the identified first patch is to the left of the identified second patch.

11. The method of claim 10, further comprising using the identified first and second patches as associated with a right hand to control an operation of the touch-surface device.

12. The method of claim 9, further comprising identifying the first and second patches as associated with a left hand when the identified first patch is to the right of the identified second patch.

13. The method of claim 9, further comprising:
   identifying the first and second patches as associated with a right hand when the identified first patch is to the left of the identified second patch;
   identifying the first and second patches as associated with a left hand when the identified first patch is to the right of the identified second patch; and
   performing a first action on the touch-surface device when the identified first and second patches are associated with a right hand; and performing a second, different action on the touch-surface device when the identified first and second patches are associated with a left hand.

14. A touch-surface device, comprising:
   a touch-surface adapted to receive touch input;
   a processor coupled to the touch-surface; and
   memory storing instructions to perform the method of claim 1.

15. The touch-surface device of claim 14, wherein the touch-surface device comprises one of a mobile telephone, a music device, a video display device and a personal computer.

16. Apparatus for discriminating input sources to a touch-surface device, comprising:
   means for obtaining a proximity image;
   means for compensating the proximity image for background noise;

means for filtering the proximity image to reduce spurious peaks, the filterng being distinct from the compensating;
means for segmenting the proximity image to identify a plurality of patches having patch pixel values;
means for reducing or down-scaling peripheral patch pixel values for one or more of the plurality of patches based on the compensated proximity image and the filtered proximity image, the reducing or down-scaling being distinct from the compensating and filtering;
means for determining an eccentricity value for one or more of the reduced or down-scaled peripheral patch pixel values of the plurality of patches;
means for identifying a first patch as a thumb contact when the eccentricity value of the first patch is greater than a first threshold; and
means for using the identified patch to control an operation of a touch-surface device.

17. Apparatus as recited in claim 16, further comprising means for identifying a second patch as a fingertip contact when the eccentricity value of the second patch is less than the first threshold.

18. Apparatus as recited in claim 17, further comprising:
means for identifying the first and second patches as associated with a right hand when the identified first patch is to the left of the identified second patch;
means for identifying the first and second patches as associated with a left hand when the identified first patch is to the right of the identified second patch; and
means for performing a first action on the touch-surface device when the identified first and second patches are associated with a right hand; and
means for performing a second, different action on the touch-surface device when the identified first and second patches are associated with a left hand.

19. A non-transitory program storage device, readable by a programmable control device, comprising instructions stored thereon for causing the programmable control device to perform the method of claim 1.

20. A portable electronic device, comprising:
a multi-touch input touch-surface component;
means for receiving a proximity image from the multi-touch input touch-surface; and
processing means for performing acts in accordance with claim 1.

21. A method to discriminate input sources to a touch-surface device, comprising:
obtaining a proximity image;
compensating the proximity image for background noise;
filtering the proximity image;
segmenting the proximity image to identify a plurality of patches having patch pixel values;
reducing or down-scaling peripheral patch pixel values for one or more of the plurality of patches based on the compensated proximity image and the filtered proximity image;
determining an eccentricity value for one or more of the reduced or down-scaled peripheral patch pixel values of the plurality of patches;
determining a minor radius value for one or more of the reduced or down-scaled peripheral patch pixel values of the plurality of patches;
ignoring each patch having a minor radius value greater than a first threshold;
after ignoring each patch having a minor radius value greater than the first threshold, identifying a first patch as a thumb contact when the eccentricity value of the first patch is greater than a second threshold; and
using the identified patch to control an operation of a touch-surface device.

22. The method of claim 21, further comprising, identifying the first patch as a fingertip contact when the eccentricity value of the first patch is less than the first threshold.

23. The method of claim 22, further comprising using the identified first patch as a fingertip contact to control an operation of the touch-surface device.

24. The method of claim 21, wherein the first threshold of the eccentricity value is between 1.0-1.5.

25. The method of claim 21, wherein the first threshold of the eccentricity value is 1.5.

26. The method of claim 21, wherein the first threshold is a linear function.

27. The method of claim 21, wherein the first threshold is a non-linear function.

28. The method of claim 21, further comprising identifying patches that are larger than thumb contacts, and ignoring the identified larger patches.

29. The method of claim 21, identifying a second patch as a fingertip contact when the eccentricity value of the second patch is less than the first threshold.

30. The method of claim 29, further comprising identifying the first and second patches as associated with a right hand when the identified first patch is to the left of the identified second patch.

31. The method of claim 30, further comprising using the identified first and second patches as associated with a right hand to control an operation of the touch-surface device.

32. The method of claim 29, further comprising identifying the first and second patches as associated with a left hand when the identified first patch is to the right of the identified second patch.

33. The method of claim 29, further comprising:
identifying the first and second patches as associated with a right hand when the identified first patch is to the left of the identified second patch;
identifying the first and second patches as associated with a left hand when the identified first patch is to the right of the identified second patch; and
performing a first action on the touch-surface device when the identified first and second patches are associated with a right hand; and performing a second, different action on the touch-surface device when the identified first and second patches are associated with a left hand.

34. A touch-surface device, comprising:
a touch-surface adapted to receive touch input;
a processor coupled to the touch-surface; and
memory storing instructions to perform the method of claim 21.

35. The touch-surface device of claim 34, wherein the touch-surface device comprises one of a mobile telephone, a music device, a video display device and a personal computer.

36. A method to discriminate input sources to a touch-surface device, comprising:
means for obtaining a proximity image;
means for compensating the proximity image for background noise;
means for filtering the proximity image;
means for segmenting the proximity image to identify a plurality of patches having patch pixel values;
means for reducing or down-scaling peripheral patch pixel values for one or more of the plurality of patches based on the compensated proximity image and the filtered proximity image;

means for determining an eccentricity value for one or more of the reduced or down-scaled peripheral patch pixel values of the plurality of patches;

means for determining a minor radius value for one or more of the reduced or down-scaled peripheral patch pixel values of the plurality of patches;

means for ignoring each patch having a minor radius value greater than a first threshold;

means for, after ignoring each patch having a minor radius value greater than the first threshold, identifying a first patch as a thumb contact when the eccentricity value of the first patch is greater than a second threshold; and means for using the identified patch to control an operation of a touch-surface device.

37. Apparatus as recited in claim 36, further comprising means for identifying a second patch as a fingertip contact when the eccentricity value of the second patch is less than the first threshold.

38. Apparatus as recited in claim 37, further comprising:

means for identifying the first and second patches as associated with a right hand when the identified first patch is to the left of the identified second patch;

means for identifying the first and second patches as associated with a left hand when the identified first patch is to the right of the identified second patch; and means for performing a first action on the touch-surface device when the identified first and second patches are associated with a right hand; and means for performing a second, different action on the touch-surface device when the identified first and second patches are associated with a left hand.

39. A non-transitory program storage device, readable by a programmable control device, comprising instructions stored thereon for causing the programmable control device to perform the method of claim 36.

40. A portable electronic device, comprising:

a multi-touch input touch-surface component;

means for receiving a proximity image from the multi-touch input touch-surface; and processing means for performing acts in accordance with claim 36.

* * * * *

UNITED STATES PATENT AND TRADEMARK OFFICE
CERTIFICATE OF CORRECTION

PATENT NO.        : 8,531,425 B2                                        Page 1 of 1
APPLICATION NO.   : 13/560719
DATED             : September 10, 2013
INVENTOR(S)       : Wayne Carl Westerman It is certified that error appears in the above-identified patent and that said Letters Patent is hereby corrected as shown below:

In the Claims:

At column 17, claim number 1, line number 63, delete "filterng being district from the compensating" and enter -- filtering being distinct from the compensating --.

At column 19, claim number 16, line 2, delete "peaks, the filterng being distinct from the compensating" and enter -- peaks, the filtering being distinct from the compensating --.

Signed and Sealed this
Fourth Day of February, 2014

Michelle K. Lee
*Deputy Director of the United States Patent and Trademark Office*